(12) United States Patent
Brikman et al.

(10) Patent No.: US 9,201,579 B2
(45) Date of Patent: Dec. 1, 2015

(54) SLIDE TO APPLY

(71) Applicant: LinkedIn Corporation, Mountain View, CA (US)

(72) Inventors: Yevgeniy Jim Brikman, Menlo Park, CA (US); Bowei Gai, San Francisco, CA (US); Matthew David Shoup, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 56 days.

(21) Appl. No.: 13/708,842

(22) Filed: Dec. 7, 2012

(65) Prior Publication Data

US 2014/0160033 A1    Jun. 12, 2014

(51) Int. Cl.
*G06F 3/0484* (2013.01)
*G06F 3/0488* (2013.01)
*H04L 29/06* (2006.01)

(52) U.S. Cl.
CPC .......... *G06F 3/04845* (2013.01); *G06F 3/0488* (2013.01); *H04L 63/102* (2013.01)

(58) Field of Classification Search
CPC .. G06F 1/3215; G06Q 10/1053; G06Q 10/06; G06Q 10/105; G06Q 10/063112; G06Q 50/01; G06Q 30/0269
USPC ......................................................... 345/173
See application file for complete search history.

(56) References Cited

U.S. PATENT DOCUMENTS

| | | | |
|---|---|---|---|
| 7,532,196 B2 | 5/2009 | Hinckley | |
| 7,636,794 B2 | 12/2009 | Ramos et al. | |
| 2005/0093868 A1* | 5/2005 | Hinckley | 345/502 |
| 2005/0228709 A1* | 10/2005 | Segal | 705/9 |
| 2011/0209104 A1 | 8/2011 | Hinckley et al. | |
| 2011/0231783 A1* | 9/2011 | Nomura | 715/761 |
| 2012/0139865 A1 | 6/2012 | Krah et al. | |
| 2012/0242596 A1 | 9/2012 | Sip | |
| 2013/0169550 A1 | 7/2013 | Gai et al. | |

OTHER PUBLICATIONS

Apple (iPhone_iOS4_User_Guide.pdf attached).*
MS Windows (internet archive at https://web.archive.org/web/20120616024117/http://msdn.microsoft.com/en-us/library/ff793459.aspx, dated on Jun. 16, 2012, attached as windows.pdf in this office action).*

(Continued)

*Primary Examiner* — Charles V. Hicks
*Assistant Examiner* — Charles Zheng
(74) *Attorney, Agent, or Firm* — Schwegman Lundberg & Woessner, P.A.

(57) ABSTRACT

According to various exemplary embodiments, user input of a single continuous gesture from a touch-sensitive surface of a first device to a touch-sensitive surface of a second device is detected. It is determined that the gesture corresponds to a drag-and-drop operation performed on an icon displayed on the touch-sensitive surface of the first device, the icon representing user profile information. Moreover, it is determined that the gesture terminates proximate to a job position user interface element in a job recruitment user interface window displayed on the touch-sensitive surface of the second device. Thereafter, the user profile information of the user is transferred from the first device to the second device.

16 Claims, 24 Drawing Sheets

(56) References Cited

OTHER PUBLICATIONS

"U.S. Appl. No. 13/453,952, Examiner Interview Summary mailed Jul. 16, 2014", 3 pgs.

"U.S. Appl. No. 13/453,952, Final Office Action mailed Oct. 27, 2014", 39 pgs.

"U.S. Appl. No. 13/453,952, Non Final Office Action mailed Mar. 20, 2014", 36 pgs.

"U.S. Appl. No. 13/453,952, Response filed Jun. 20, 2014 to Non Final Office Action mailed Mar. 20, 2014", 11 pgs.

Everitt, Katherine M., et al., "Two Worlds Apart: Bridging the Gap Between Physical and Virtual Media for Distributed Design Collaboration", CHI 2003, (Apr. 5-10, 2003), 8 pgs.

Hartmann, Bjorn, et al., "Augmenting Interactive Tables with Mice & Keyboards", UIST '09, (Oct. 4-7, 2008), 4 pgs.

Hartmann, Bjorn, et al., "Pictionaire: Supporting Collaborative Design Work by Integrating Physical and Digital Artifacts", CSCW 2010, (Feb. 6-10, 2010), 4 pgs.

Hinckley, Ken, et al., "Stitching: Pen Gestures that Span Multiple Displays", Submitted to CHI 2004, (Oct. 6, 2003), 8 pgs.

Ramos, Gonzalo, et al., "Synchronous Gestures in Multi-Display Environments", [Online]. Retrieved from the Internet: <URL: http://kenhinckley.wordpress.com/2009/04/21/paper-synchronous-gestures-in-multi-display-environments/, (Apr. 21, 2009), 105 pgs.

Yeh, Ron Bing, "Designing Interactions that Combine Pen, Paper and Computer", Doctoral dissertation submitted to the Department of Computer Science and the Committee on Graduate Studies at Stanford University, (Dec. 2007), 261 pgs.

"U.S. Appl. No. 13/453,952, Notice of Allowance mailed Mar. 30, 2015", 8 pgs.

"U.S. Appl. No. 13/453,952, Response filed Feb. 25, 2015 to Final Office Action mailed Oct. 27, 2014", 14 pgs.

"U.S. Appl. No. 13/453,952, Supplemental Notice of Allowability mailed May 13, 2015", 2 pgs.

* cited by examiner

Fig. 2: Multi-Device Pairing Steps

Fig. 3: Client Architecture

Fig. 4: Pairing Server Architecture

Fig. 5: 3rd Party Server Architecture

Fig. 6: Characterization Engine Architecture

Fig. 7: Comparison Engine Architecture

Fig. 9: Bluetooth pairing

Fig. 10: Wifi pairing

| Field Type | Position | Entity | Time Period |
|---|---|---|---|
| Experience | Software Engineer | ABC Corp. | December 2008-Present |
| | Software Engineer | XYZ Corp. | December 2003-December 2008 |
| Education | B.S.E. Software Engineering | University of Michigan | 1999-2003 |

| Name | Field Type | Position | Entity | Time Period |
|---|---|---|---|---|
| John Smith | Experience | Software Engineer | ABC Corp. | December 2008-Present |
|  |  | Software Engineer | XYZ Corp. | December 2003-December 2008 |
|  | Education | B.S.E. Software Engineering | University of Michigan | 1999-2003 |
| Alice Smith | ⋮ | ⋮ | ⋮ | ⋮ |
| Bob Smith | ⋮ | ⋮ | ⋮ | ⋮ |

┌─────────────────────────────────────────────────┐
│                                                 │
│  Job Qualifications for available job position "Software Engineer"  │
│                                                 │
│  Experience: 3+ Years Experience as a Software Engineer  │
│                                                 │
│  Education: B.S.E. in Software Engineering,     │
│             Computer Engineering,               │
│             Computer Science Engineering, or    │
│             Electrical Engineering              │
│                                                 │
└─────────────────────────────────────────────────┘
```

┌─────────────────────────────────────────────────┐
│                                                 │
│  Job Applicant "John Smith" meets the minimum job qualifications  │
│  for available job position "Software Engineer"  │
│                                                 │
│  Experience: 3+ Years Experience as a Software Engineer ✓  │
│                                                 │
│  Education: B.S.E. in Software Engineering, ✓   │
│             Computer Engineering,               │
│             Computer Science Engineering, or    │
│             Electrical Engineering              │
│                                                 │
└─────────────────────────────────────────────────┘
```

*Fig. 21b*

SLIDE TO APPLY

TECHNICAL FIELD

This patent document pertains generally to tools (systems, apparatuses, methodologies, computer program products, etc.) for assisting job applicants with applying for available job positions.

BACKGROUND

Conventionally, when a user is applying for an available job position, the user typically visits a website associated with an employer or recruiter, and then manually enters their biographical information (e.g., name, location, education, experience, etc.) into text entry fields on the website, and/or that the user uploads such biographical information (e.g., in the form of a resume) to the website. As another example, if the user is attending a job recruiting fair, the user typically provides a recruiter with a hard copy of their resume. Thus, on the side of the job applicants, the process for applying for jobs remains a time-consuming and labor-intensive process. Moreover, on the side of recruiters and employers, the process of collecting and managing information received in different formats from large numbers of job applicants remains challenging.

BRIEF DESCRIPTION OF DRAWINGS

Some embodiments are illustrated by way of example and not limitation in the figures of the accompanying drawings in which:

FIG. 16 illustrates an example of user profile data, according to various exemplary embodiments.

FIG. 18 illustrates an example of a data structure, according to various exemplary embodiments.

FIG. 21a illustrates an example of job qualification information associated with an available drive position, according to various exemplary embodiments.

FIG. 21b illustrates an example of a notification, according to various exemplary embodiments.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Figure 1:
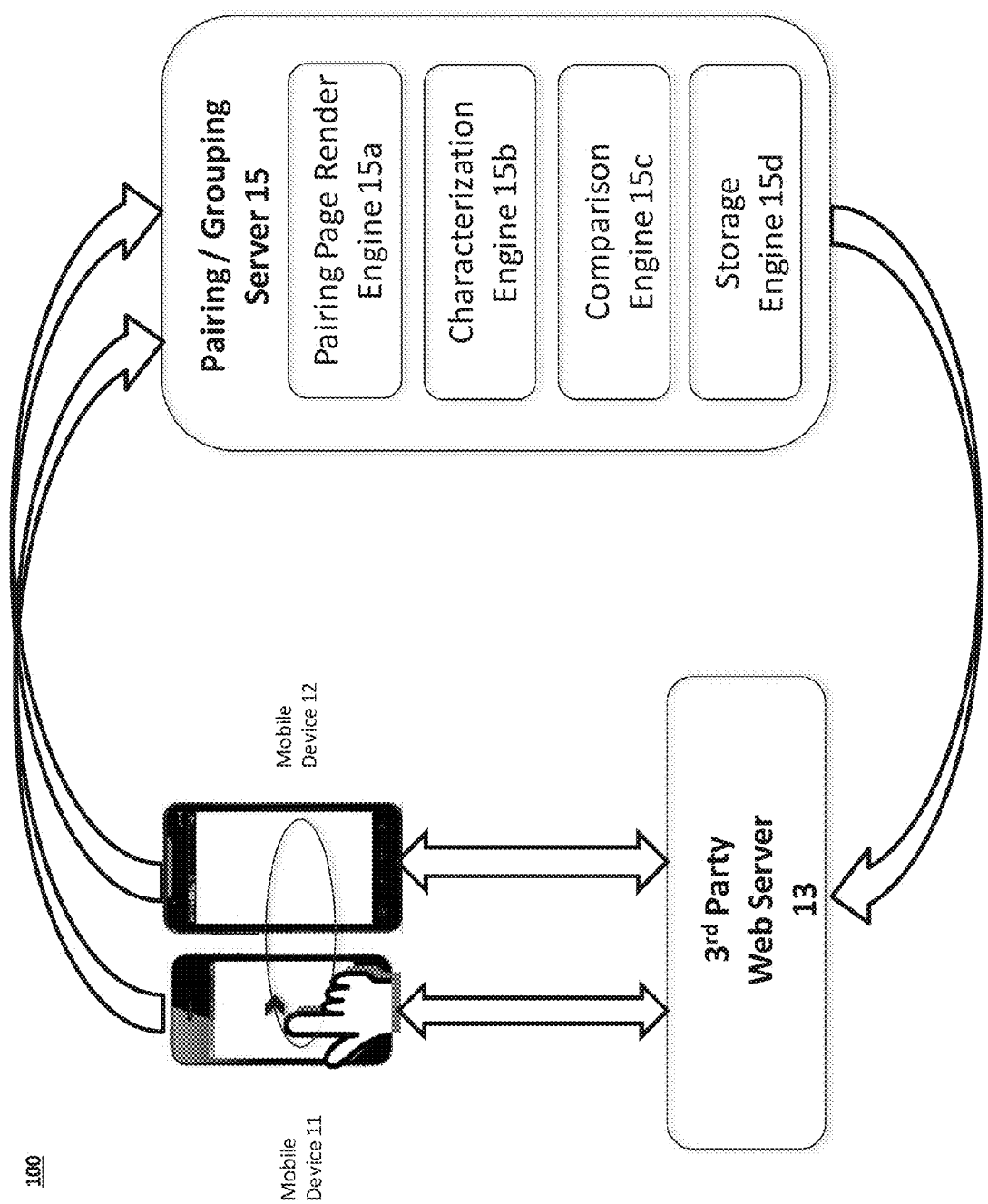
FIG. 1 is a block diagram illustrating a system for pairing and syncing mobile electronic devices, according to an exemplary embodiment.

Turning now to FIG. 1, there is illustrated an environment 100 for pairing and syncing electronic devices according to an exemplary embodiment. The mobile device pairing environment 100 illustrated in FIG. 1 includes a first mobile device 11, a second mobile device 12, a $3^{rd}$ party server 13 and a pairing/grouping server 15. As described in this disclosure, the term 'mobile devices' refers to smartphones, mobile/cellular phones or handsets, personal digital assistants (PDAs), tablet computing devices, personal, notebook or workstation computers, multi-function devices (MFDs), kiosks, timepieces, and any other mobile electronic devices that typically include a touchscreen display (also referred to herein as a "touch-sensitive surface"), as understood by those skilled in the art. Thus, mobile device 11 and 12 may correspond to one or more of the aforementioned devices. According to this exemplary embodiment, the mobile devices 11 and 12 are Internet connected devices with touchscreens. The mobile devices 11 and 12 may also be configured with GPS or geolocation systems and may include HTML5 compatibility, as is the case with most mobile devices (e.g. smartphones) currently in use.

In order to pair touchscreen-enabled devices (such as mobile devices 11 and 12) according to this exemplary embodiment, a basic overview of the workflow is as follows. First, each user of the mobile devices 11 and 12 opens a customized webpage on a browser software application installed on each device, such that the customized webpage may be displayed on the touchscreens of the mobile devices. Thereafter, the mobile devices 11 and 12 are placed side by side (i.e. adjacent to each other, and in contact with each other, or in very close physical proximity to each other). Finally, a user performs a single, uniform, and continuous gesture/motion across the touchscreens of the multiple mobile devices that are displaying the customized web page. The single continuous gesture may be, for example a single loop gesture, zigzag gesture, staircase gesture, or any other gesture with at least one entry point and exit point on the touchscreen of each device. For example, with a finger, pen, or stylus, the user touches the touchscreen of one of the mobile devices 11, and begins to draw a single loop gesture (e.g. a circle, ellipse, rectangle, square triangle) starting on the touchscreen of the first mobile device 11, extending across the touchscreen of the second mobile device 12, and returning back to the touchscreen of the first mobile device 11, to thereby complete the single loop gesture motion (e.g. a circle), as seen in FIG. 1.

While the description above refers to each device opening a customized webpage on a browser software application installed on each device in order to receive the touch gesture information, the aspects of this disclosure are not limited to such webpages, so long as each mobile device can detect or receive the touch gesture coordinates and transmit the same over a network. For example, the device's touchscreen could receive the touch gesture co-ordinate information via an embedded application or native application of the device, where such device transmits the touch gesture co-ordinate information via the network.

The pairing/grouping server 15 detects the single gesture motion performed by the user that extends across the touchscreens of both mobile devices 11 and 12 that are displaying the customized web page, and determines that this is a request by the user to pair/group the two devices. The pairing/grouping server 15 proceeds to pair/group the two mobile devices to thereby allow the user(s) of both devices to share information or perform some action between the two devices, such as syncing data and sharing contact information, photos, video, music, documents, files, payment information, geographic location or map information, etc., or enabling the users of the two mobile devices to commence playing a game together on the two mobile devices.

According to the system of this disclosure, pairing/grouping by the pairing/grouping server 15 is performed almost instantaneously (i.e. within a fraction of a second) and visually displayed to the user. It is a very fast and intuitive way to connect devices that may be both satisfying and visually appealing to the user. Different pre-defined gestures (described in more detail below) that can be performed across multiple devices can each be bound with respective specific actions as a quick and versatile way to exchange information.

As seen in FIG. 1, the major components in the environment 100 are the mobile devices 11 and 12, the pairing server 15 and the $3^{rd}$ party server 13. A basic overview of the workflow performed in the environment 100 is as follows. $3^{rd}$ party server 13 may be a web server designed to communicate with the mobile devices 11 and 12 via a network, such as the Internet, and configured to generate a custom web page for the devices 11 and 12, and host the web page accessible via a browser application operating on the mobile devices 11 and 12. Alternatively, $3^{rd}$ party server 13 may generate the code (e.g. HTML and Javascript) for the customized webpage, and transmit the same to the pairing server 15. The pairing page render engine 15a of the pairing server 15 can then communicate with the mobile devices 11 and 12 in order to render the customized webpage in the browser application operating on the mobile devices 11 and 12.

While the descriptions above, and elsewhere throughout this disclosure refer to the generation of code for the customized webpage in the form of HTML code or Javascript code, it will be understood by those skilled in the art that the customized webpage may be generated based on any applicable code, web communication protocol, format, markup language, etc. For example, the code of the customized webpage could be generated using web sockets, wherein a persistent connection is established between two devices communicating with each other.

The custom web page is configured to permit the mobile devices 11 and 12 to pass custom information (such as user/device identification information) and gesture information to the pairing server 15. That is, the users of devices 11 and 12 access and display the custom web page and perform the single motion gesture across the touchscreen of both mobile devices 11 and 12, and then the devices 11 and 12 return custom information (such as user/device identification information) along with gesture information (describing a gesture performed by the user on the touchscreen of each device 11 and 12) via the custom webpage through the network to the pairing server 15. The pairing server 15 then determines that the devices 11 and 12 are to be paired, proceeds to pair the devices by establishing a communication link between the devices, and confirms that pairing. The pairing server 15 then communicates confirmation of the pairing to the $3^{rd}$ party server 13 once the pairing is confirmed. After the $3^{rd}$ party server 13 receives the confirmation of the pairing, the $3^{rd}$ party server 13 can directly transfer/sync files and perform other actions across the paired mobile devices 11 and 12.

The pairing/grouping server 15 includes a pairing page render engine 15a, characterization engine 15b, comparison engine 15c, and storage engine 15d. The operation of the pairing server 15 and of each of the components thereof is described in more detail with reference to FIG. 2.

Figure 2:
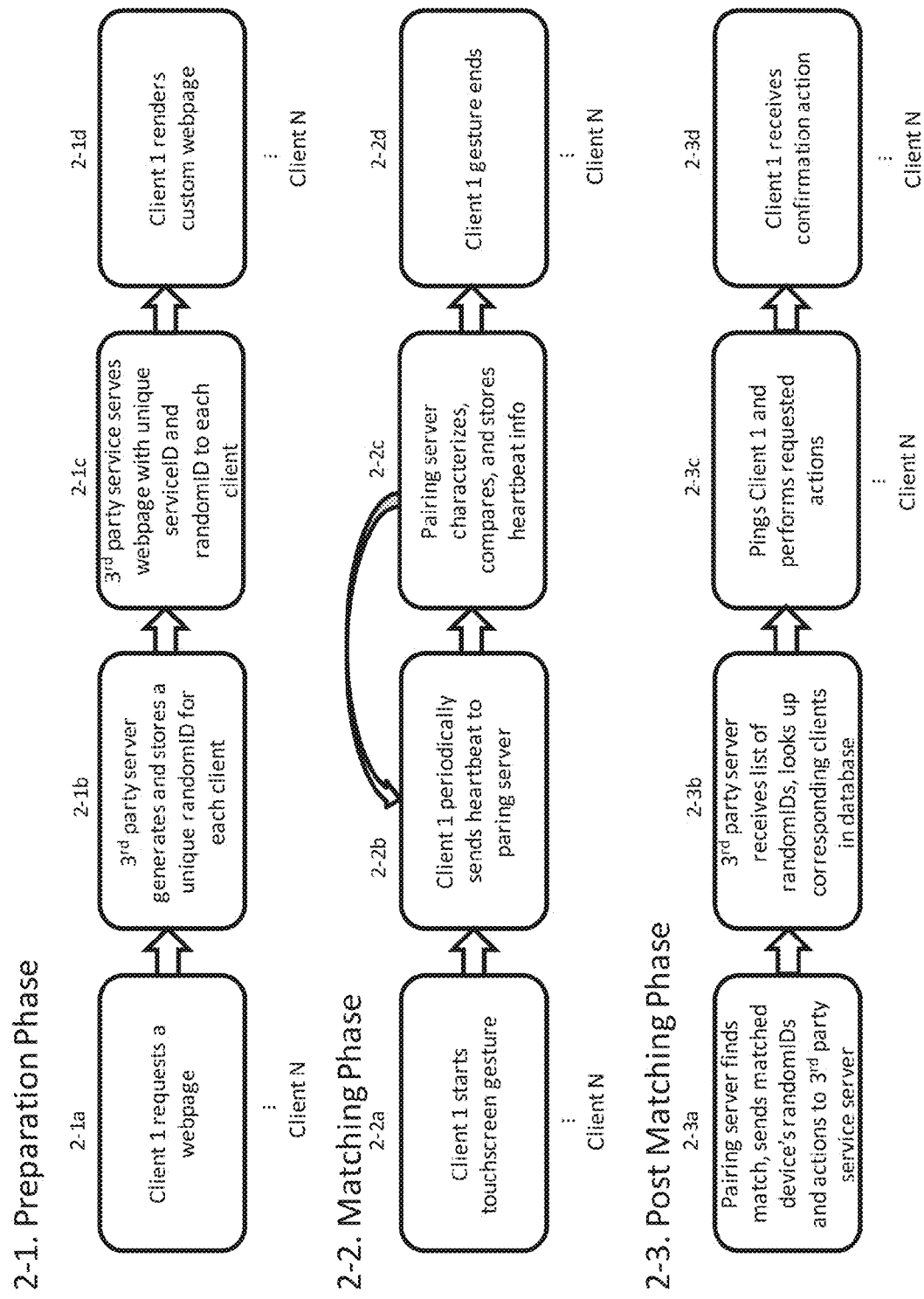
FIG. 2 illustrates three phases of operations performed in the mobile device pairing system illustrated in FIG. 1, according to an exemplary embodiment.

In FIG. 2, three phases of the operations occurring in the mobile device pairing environment 100 are described: 2-1 the preparation phase; 2-2 the matching phase; and 2-3 the post matching phase.

In the preparation phase 2-1, the client 1 (e.g. mobile device 11) transmits a request to the $3^{rd}$ party server 13 for the customized webpage (2-1a). This is repeated for client 2 (e.g. mobile device 12) and for each client up to client N. Then the $3^{rd}$ party server 13 generates and stores a unique randomID for each client (2-1b). The randomID could either be generated based on a purely random string, or could be a foreign key to some other account identifying mechanism (e.g. derived from a $3^{rd}$ party service or a profile page corresponding to the user of the client device, such as a hashed version of that person's ID created using hash mechanism). The $3^{rd}$ party server generates for each client a customized webpage, unique serviceID and randomID, and stores this information in a third party server database 14 (see FIG. 5), and transmits the customized webpage incorporating the serviceID and randomID to each client (2-1c). Finally, when each client (client 1 through client N) receives the customized webpage, that client renders the respective custom webpage (2-1d), typically in a browser application installed on the respective client. Thus, the customized webpage may be displayed on a touchscreen of the mobile device to the user of that client/device.

Alternatively, in the preparation phase 2-1, the pairing server 15 may have greater involvement. For example, the client 1 (e.g. mobile device 11) transmits a request to the $3^{rd}$ party server 13 for the customized webpage (2-1a). This is repeated for client 2 (e.g. mobile device 12) and for each client up to client N. Then the $3^{rd}$ party server 13 generates and stores a unique randomID for client (2-1b). The $3^{rd}$ party server generates for each client a customized webpage (including HTML code and Javascript code, for example) that displays/incorporates a unique serviceID and randomID unique to the client, stores this information in a third party server database 14 (see FIG. 5), and transmits the customized webpage incorporating the serviceID and randomID to the pairing server 15. The pairing page render engine 15a of the pairing server 15 can then communicate with the mobile devices 11 and 12 in order to render the customized webpage in the browser application operating on the mobile devices 11 and 12. (2-1c). Finally, when each client (client 1 through client N) receives the customized webpage, that client renders the respective custom webpage (2-1d), typically in a browser application installed on the respective client. Thus, the customized webpage may be displayed on a touchscreen of the mobile device to the user of that client/device.

In the matching phase 2-2, the user of client 1 (e.g. mobile device 11) starts touchscreen gesture/motion on the touchscreen of that device (2-2a). Thereafter, client 1 periodically sends a data signal transmission (referred to herein as 'heartbeat' information) via the customized webpage to the pairing server 15 (2-2b). More particularly, this information is received by the pairing page render engine 15a or characterization engine 15b of the pairing server 15. The heartbeat indicates a large amount of information regarding the user inputs detected and received by the touchscreen of that device—that is, the heartbeat periodically describes information regarding the touchscreen gesture motion being performed on the touchscreen of the device. The heartbeat may describe information such as the gesture X,Y coordinates, velocity, acceleration, curvature, entry/exit points, time difference and any induced vibrations.

After the pairing server 15 receives the heartbeat information from the client device 1, the characterization engine 15b of the pairing server 15 analyzes and characterizes the heartbeat information received from that device in order to determine the exact nature, type and characteristics of the fingerprint gesture being performed by the user on that device's touchscreen (2-2c). The storage engine 15d of the pairing server 15 also stores all the heartbeat information received from that device. (Moreover, at this step, the comparison engine 15c of the pairing server 15 also compares the received heartbeat information with any heartbeat information received from other devices, in order to determine if the gestures received from different mobile devices match). The process of 2-2b (client transmitting heartbeat information regarding touchscreen gesture to pairing server while gesture is being performed) and 2-2c (pairing server analyzes, characterizes, compares and stores heartbeat information) are repeated so long as the user is performing the touchscreen gesture on the touchscreen of the client device 1. Finally, the touchscreen gesture motion being performed by the user of the client device 1 ends (2-2d). The end or completion of the gesture may be detected when the touchscreen gesture co-ordinate information indicates that the gesture has reached the limit of the touch screen, or no touchscreen gesture co-ordinate information is received after a predetermined time (indicating the finger has been removed from the touchscreen).

Thereafter, the matching phases 2-2a through 2-2d are performed again for each of the devices (client 1 through client N) from which heartbeat information is being received, when the user's finger/pen reaches the touchscreen of that respective device while the user is performing the single, continuous, uniform touchscreen gesture on the touchscreens of the multiple devices. When steps 2-2b and 2-2c are performed for the heartbeat information received from each device, the comparison engine 15c of the pairing server 15 compares the received heartbeat information with any heartbeat information received from other devices, in order to determine the exact nature, type and characteristics of the fingerprint gesture being performed on each device, and in order to determine whether the gestures received from certain mobile devices 'match'—i.e. corresponding to a single, continuous, uniform gesture being performed. Instead, or in addition, this is performed in the post-matching phase 2-3.

In the post-matching phase 2-3, the comparison engine 15c of the pairing server finds a match, and sends the matched device's randomIDs and actions to $3^{rd}$ party service server 13 (2-3a). Thereafter, the $3^{rd}$ party server 13 receives the list of randomIDs, and looks up corresponding clients in the third party server database 14 (see FIG. 5) (2-3b). The third party server 13 then pings each client 1 through N that is to be paired, and performs actions request by the user of the paired devices, such as sharing information (2-3c). Finally, each paired client 1 through N that is paired receives confirmation of the performance of the requested action (2-3d).

Thus, as the user begins the touchscreen gesture on one device (e.g. mobile device 11), the device immediately starts to send a barrage of touchscreen coordinates to the pairing server 15. The server 15 takes this information and computes the continuously changing gesture fingerprint based on the gesture coordinates, velocity, acceleration, curvature, entry/exit points, time difference and any induced vibrations. As the gesture leaves one device and enters another (e.g. mobile device 12), it takes only very few datapoints before the server can match the gesture fingerprint and perform the pairing. Furthermore, the server can continually monitor the gesture fingerprint motions, and group multiple devices in a single gesture.

That is, based on the aforementioned criteria (e.g. trajectory/curvature, velocity, entry/exit points, and relative position on screen), the pairing server determines whether particular devices should be paired. For example, the comparison engine 15c may determine from the received data points or heartbeat information from a first mobile device that the touchscreen of the first device is receiving user input of a curved line of a certain trajectory/curvature, being drawn by the user at a certain velocity, and having a certain exit point at the right side of the touchscreen of the first mobile device. Similarly, the comparison engine 15c may determine from the received data points or heartbeat information from a second mobile device that the touchscreen of the second device is receiving user input of a curved line of matching/continuing along the same trajectory/curvature of the line on the first device, and being drawn by the user at the same velocity as that on the first device, and having a certain entry point on the left side of the touchscreen of the second mobile device matching the exit point on the right side of the touchscreen of the first mobile device. The comparison engine may utilize the screen size information received from each device (e.g. via HTML) in order to assist in determining a match between these entry and exit points, since the devices placed side by side may have different screen sizes or may not be placed exactly side by side in a proper upright rotation.

Figure 3:
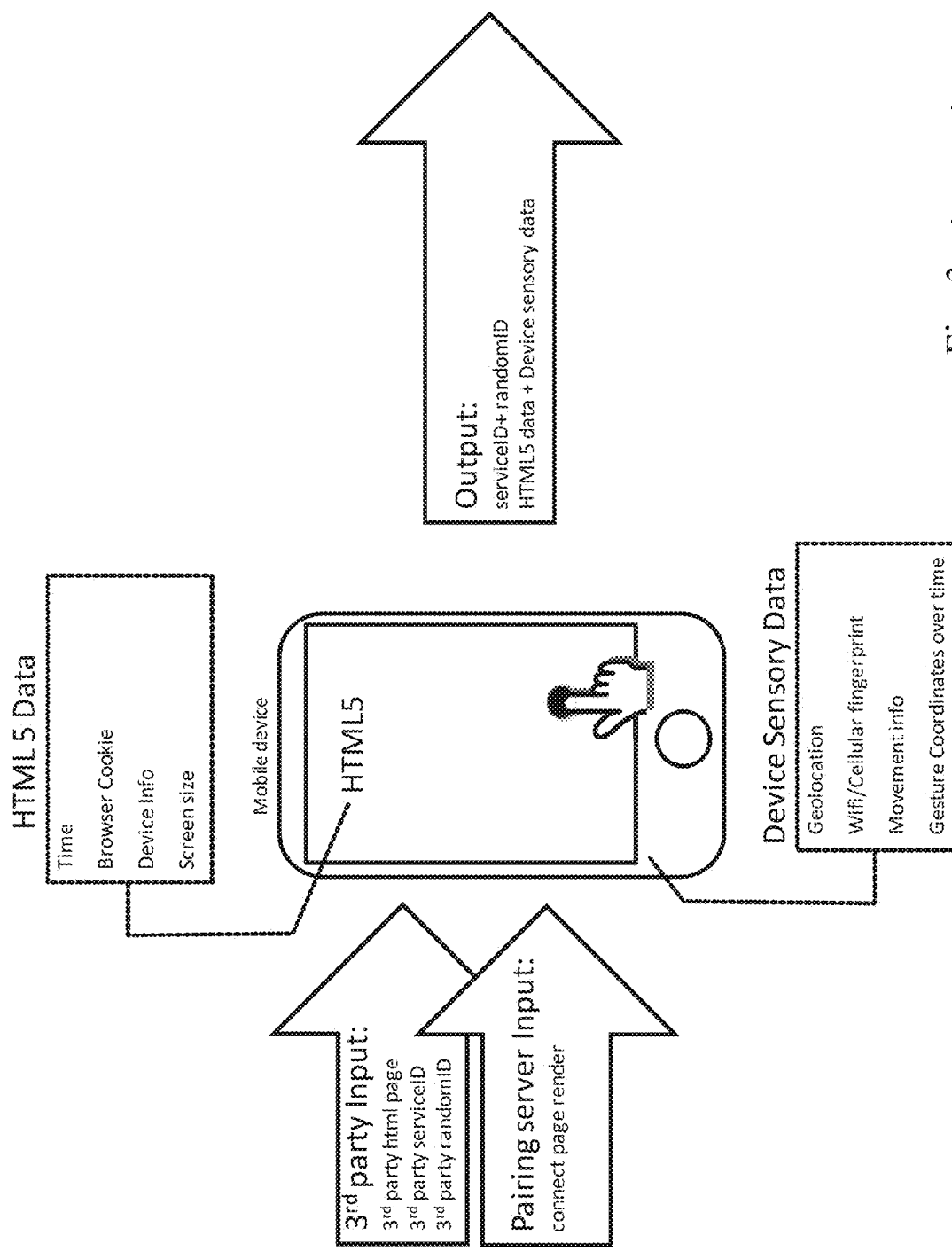
FIG. 3 illustrates a schematic of the architecture of a client device (e.g. mobile devices 11 and 12) of the mobile device pairing system illustrated in FIG. 1, according to an exemplary embodiment.

FIG. 3 illustrates a schematic of the architecture of the client (e.g. mobile devices 11 and 12) of the mobile device pairing environment 100 illustrated in FIG. 1. The client device receives information from the $3^{rd}$ party server 13 that includes the html page corresponding to the customized web page, as well as the unique serviceID and randomID (unique to each client). Alternatively, as seen in FIG. 3, $3^{rd}$ party server 13 may generate the code (e.g. HTML, Javascript, websockets, etc.) for the customized webpage, and transmit the same to the pairing server 15. The pairing page render engine 15a of the pairing server 15 can then communicate a connect page render signal to the mobile devices 11 and 12 in order to render the customized webpage in the browser application operating on the mobile devices 11 and 12 and/or receive the touchscreen gesture and heartbeat information via the customized web page.

As seen in FIG. 3, the client is configured to generate device sensory data, such as geolocation information, wifi/cellular fingerprints, movement information, and gesture coordinates over time. The client may also include HTML5 compatibility, and is configured to generate and maintain various types of HTML5 data regarding the client, such as time, device information, device model and make, local storage capability, screen size and browser cookies.

The client in FIG. 3 is also configured to output various information to the pairing server 15, such as the client's unique serviceID and randomID, as well as HTML5 data and the actual device sensory data that will be analyzed by the pairing server 15 to determine the appropriate device pairing.

Figure 4:
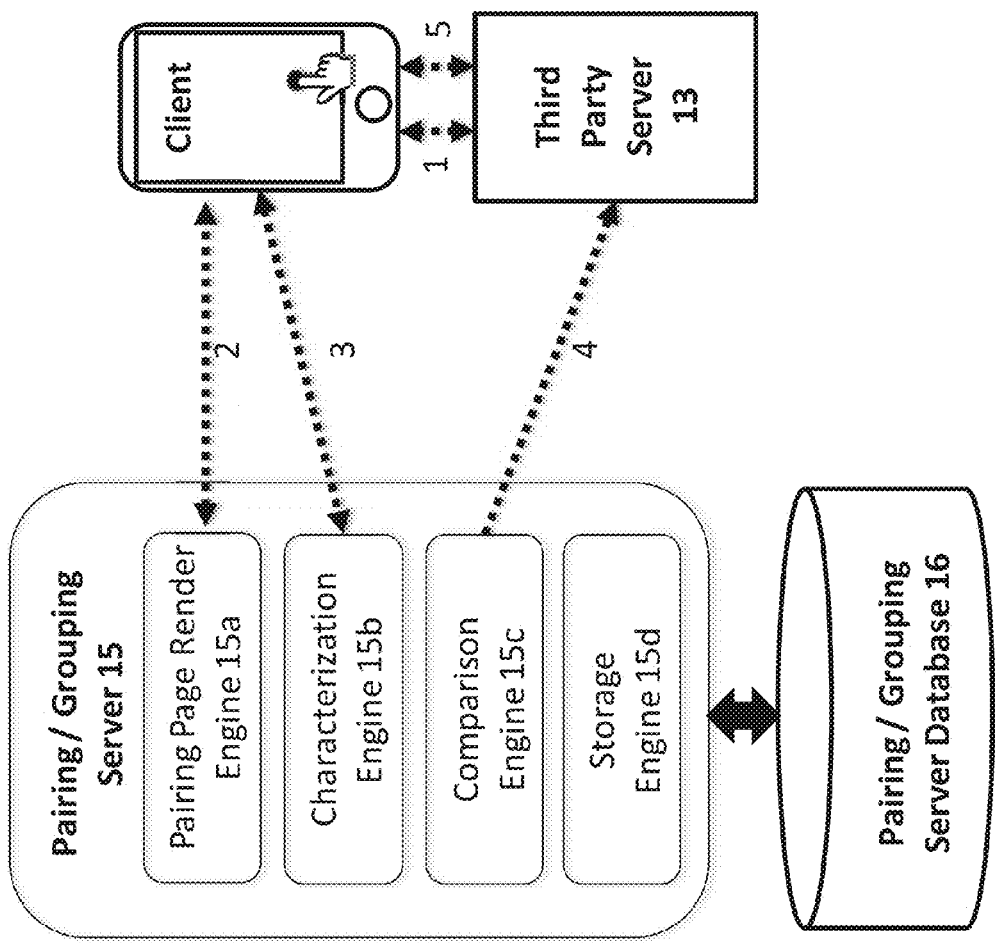
FIG. 4 illustrates a schematic of the architecture of the pairing server of the device pairing system illustrated in FIG. 1, according to an exemplary embodiment.

FIG. 4 illustrates a schematic of the architecture of the pairing server 15 of the device pairing environment 100. As seen in FIG. 4, the client is configured to communicate with the third party server 13 to request access to the customized web page (1). The $3^{rd}$ party server 13 or pairing page render engine 15a may generate the code (e.g. HTML and Javascript) for the customized webpage, and transmit the same to the pairing server 15. The pairing page render engine 15a of the pairing server 15 can then communicate with the mobile devices 11 and 12 in order to render the customized webpage in the browser or native application operating on the mobile devices 11 and 12 (2). Any gesture information or heartbeat information from the client may be transmitted to the pairing page render engine 15a (2) or the characterization engine 15b (3).

After the pairing server 15 receives the heartbeat information from the client device 1, the characterization engine 15b of the pairing server 15 analyzes and characterizes the heartbeat information received from that device in order to determine the exact nature, type and characteristics of the fingerprint gesture being performed by the user on that device's touchscreen (3). The storage engine 15d of the pairing server 15 also stores all the heartbeat information received from that device (e.g. in a pairing/grouping server database 16). The comparison engine 15c of the pairing server 15 also compares the received heartbeat information with any heartbeat information received from other devices, in order to determine if the gestures received from certain mobile devices match; thereafter, the pairing server 15 pairs those certain mobile devices and transmits a pairing confirmation to the third party server 13 (4). After the $3^{rd}$ party server 13 receives the confirmation of the pairing, the $3^{rd}$ party server 13 can directly transfer/sync files and perform other actions across the paired mobile devices (5).

The geolocation information, Wifi/cellular fingerprints, etc., received from the client can be used by the pairing server 15 to determine that mobile devices (e.g. devices 11 and 12) are in close proximity to each other, which can be factored into the determination that two or more devices are to be paired. For example, if the pairing server 15 determines that certain devices are next to each, the pairing server can determine that it is possible they are to be paired, whereas if the pairing server 15 determines that certain devices are far away from each other, the pairing server can determine that these certain devices are not to be paired.

Various information is used by the pairing server 15 to identify the client/mobile device. To identify the device, pairing server can use but is not limited to WiFi signatures, cellphone tower signatures, device/model/modem signature, cookie, received from the client device. Various information is used by the pairing server 15 to identify the pairing. To identify pairing, pairing server can use but is not limited to time, geolocation, gesture pattern, location, velocity, entry/exit points, curvature and vibration data received from the client device. Various information is used by the pairing server 15 to identify the $3^{rd}$ party server 13. To identify the $3^{rd}$ party server corresponding to the mobile devices, the pairing server uses a service key that is shared between the servers as well as a hash key value that is only known to the $3^{rd}$ party server.

Figure 5:
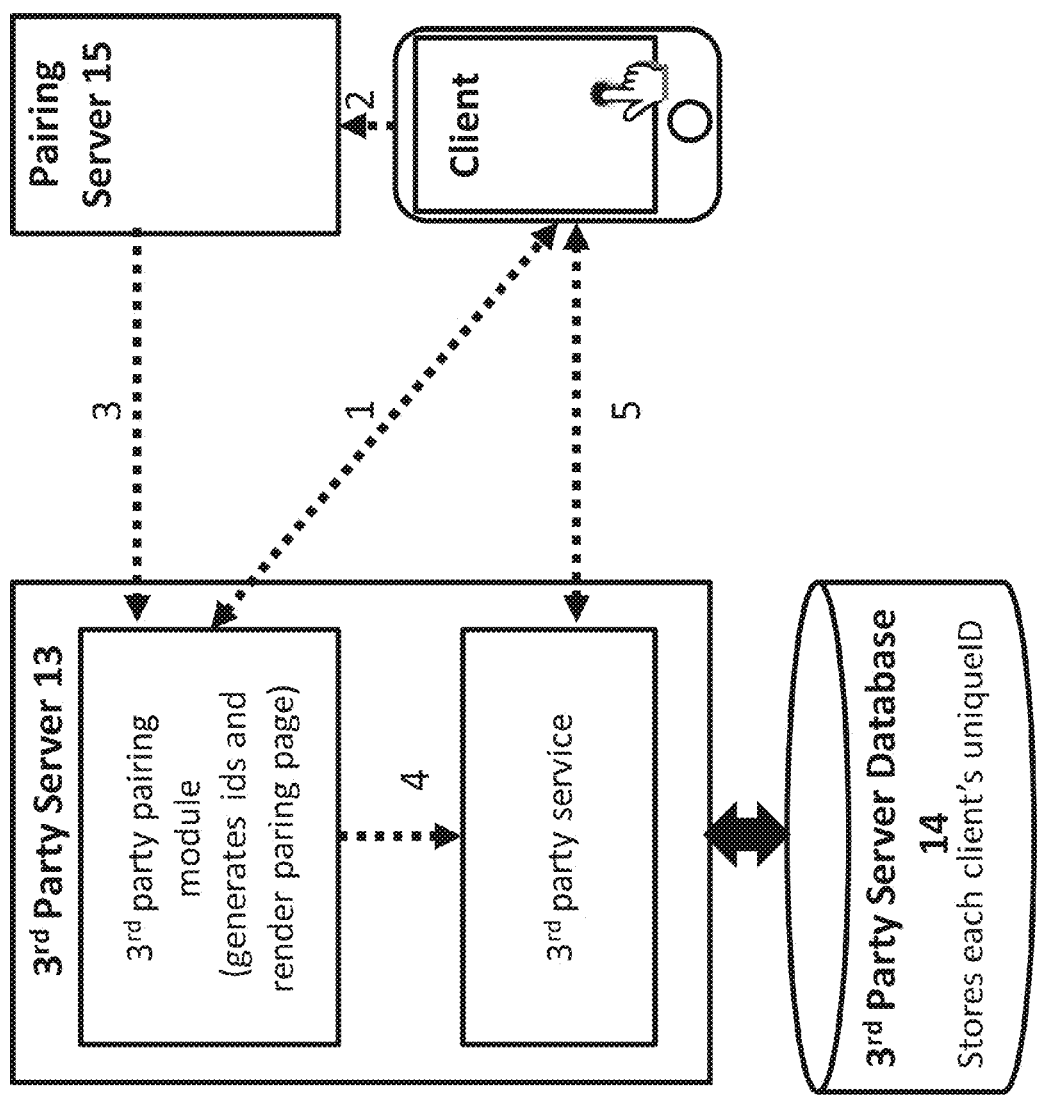
FIG. 5 illustrates a schematic of the architecture of the $3^{rd}$ party server of the device pairing system illustrated in FIG. 1, according to an exemplary embodiment.

FIG. 5 illustrates a schematic of the architecture of the $3^{rd}$ party server 13 of the device pairing environment 100. As seen in FIG. 4, the client is configured to communicate with the $3^{rd}$ party pairing module of the 3rd party server 13, which generates the unique serviceID and randomID unique to the client and stores this information in the third party server database 14, and renders the customized web page that incorporates the serviceID and random ID and which is accessible by the client (1). Thereafter, any gesture information or heartbeat information (along with serviceID and randomID) from the client is transmitted to the pairing server 15 (2) via the customized web page.

After the pairing server 15 pairs certain mobile devices and transmits a pairing confirmation to the third party server 13 (3), the $3^{rd}$ party server hosts the third party service that allows the paired clients to directly transfer/sync files or data and perform other actions across the paired mobile devices (4, 5).

Figure 6:
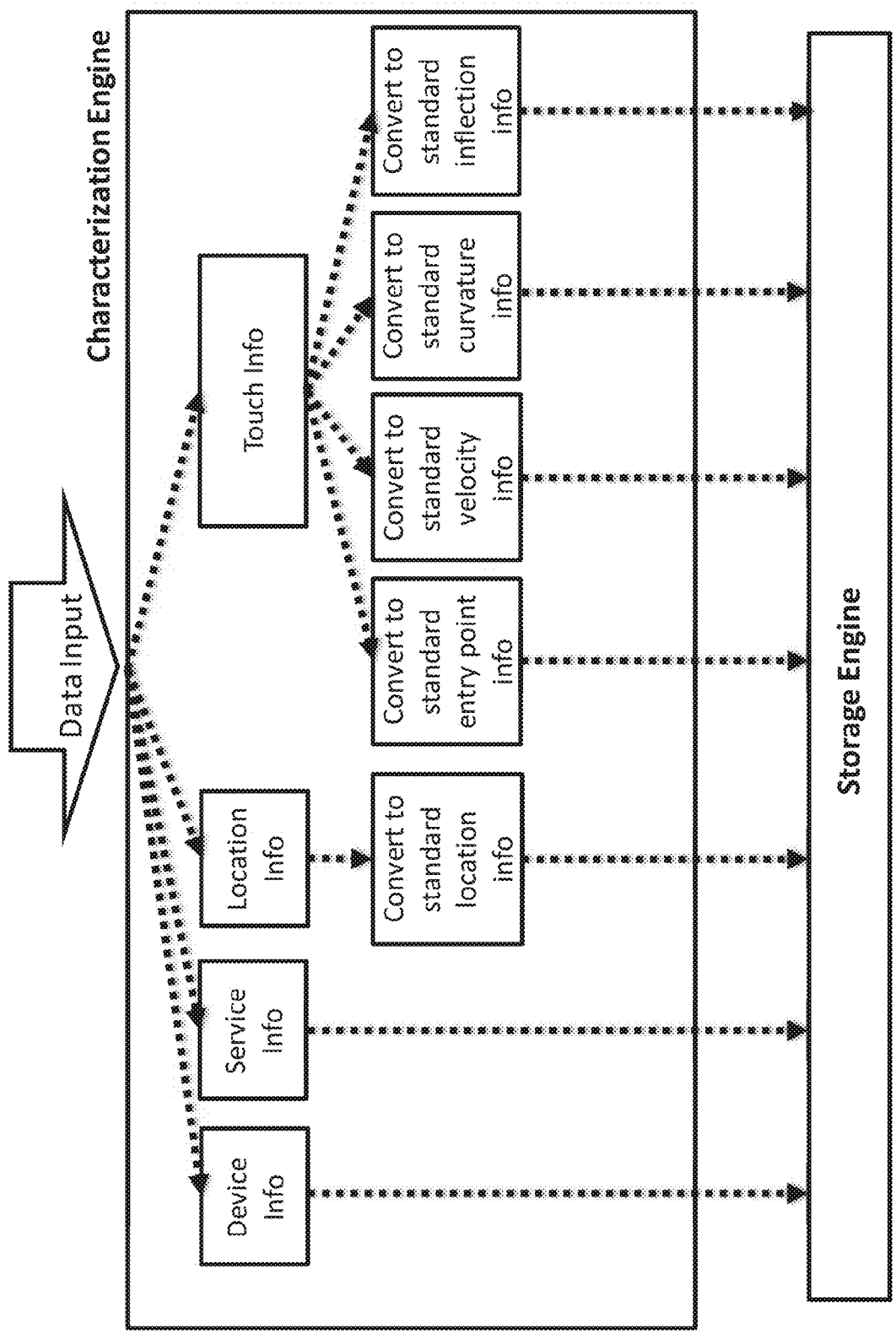
FIG. 6 illustrates a schematic of the architecture of the characterization engine of the pairing server illustrated in FIG. 1, according to an exemplary embodiment.

FIG. 6 illustrates a schematic of the architecture of the characterization engine 15b of the pairing server 15. As seen in FIG. 6, the characterization engine can receive various types of data input. For example, the characterization engine can receive device information and service information from the client, which is transmitted to the storage engine 15d for storage. Moreover, the characterization engine can receive location (e.g. WiFi/cellular footprint of the client, or geolocation information from a GPS system of the client), and convert this information into standard location information for storage by the storage engine 15d. The characterization engine can also receive the actual touchscreen fingerprint gestures or touch information from the client, wherein this information is converted into standard entry point information, standard velocity information, standard curvature information, and standard inflection information, all describing the gesture performed on the touch screen of that client device. The aforementioned information can be transmitted from the characterization engine 15b to the storage engine for storage (e.g. in the pairing/grouping server database 16 illustrated in FIG. 4) and/or provided to the comparison engine 15c.

Figure 7:
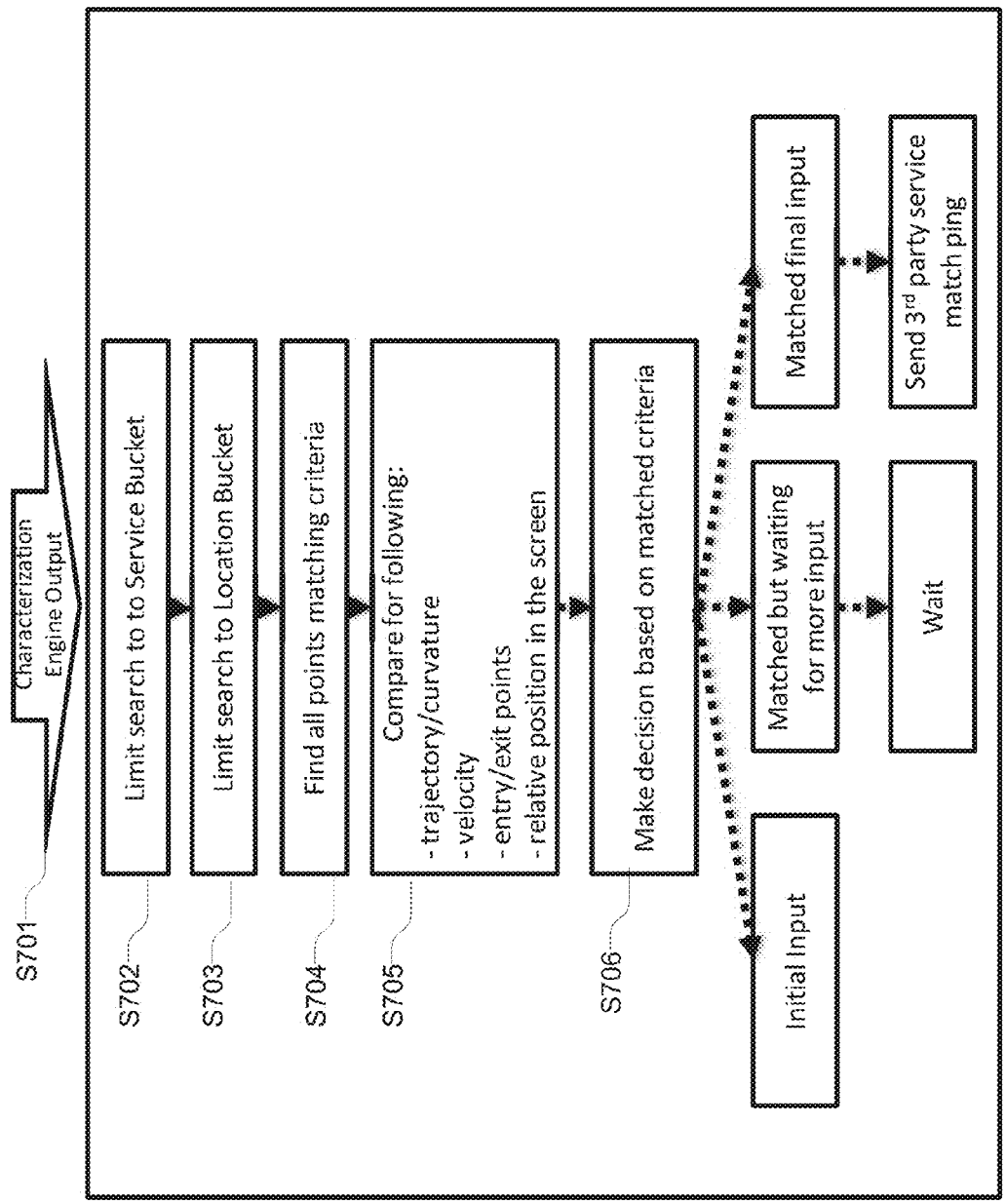
FIG. 7 illustrates a schematic of the architecture of the comparison engine 15c of the pairing server illustrated in FIG. 1, according to an exemplary embodiment.

FIG. 7 illustrates a schematic of the architecture of the comparison engine 15c of the pairing server 15. As seen in FIG. 7, the comparison engine in S701 receives various information from the characterization engine 15b and/or storage engine 15d, including device information, service information, location information and touch information (including standard entry and exit point information, standard velocity information, standard curvature information, and standard inflection information, all describing the gesture performed on the touch screen of a client device). The comparison engine can limit the search to the received service information to determine whether devices should be paired; S702. The comparison engine can then limit the search to the received location information, to determine whether devices should be paired (e.g. if the devices are near each other, it is possible they should be paired, and if they are not near each other, they should not be paired); S703. Thereafter, the comparison engine can find all points matching criteria (S704) and compare information regarding those points (e.g. trajectory/curvature, velocity, entry/exit points, and relative position on screen) (S705), in order to make a decision based on the matching criteria (S706). For example, the comparison engine may wait for more information in order to determine a match, or may have already determined a match but still wait for more input, or have determined a match after receiving the final input, after which the comparison engine sends the third party server 13 a service match ping.

Thus, based on the aforementioned criteria (e.g. trajectory/curvature, velocity, entry/exit points, and relative position on screen), the comparison engine determines whether particular devices should be paired. For example, the comparison engine may determine from the received data points or heartbeat information from a first mobile device that the touchscreen of the first device is receiving user input of a curved line of a certain trajectory/curvature, being drawn by the user at a certain velocity, and having a certain exit point at the right side of the touchscreen of the first mobile device. Similarly, the comparison engine may determine from the received data points or heartbeat information from a second mobile device that the touchscreen of the second device is receiving user input of a curved line of matching/continuing along the same trajectory/curvature of the line on the first device, and being drawn by the user at the same velocity as that on the first device, and having a certain entry point on the left side of the touchscreen of the second mobile device matching the exit point on the right side of the touchscreen of the first mobile device. The comparison engine may utilize the HTML5 screen size information received from each device in order to assist in determining a match between these entry and exit points, since the devices placed side by side may have different screen sizes or may not be placed exactly side by side.

Thus, in the device pairing system of this exemplary embodiment, a single, uniform, continuous touchscreen gesture performed across multiple devices provides a high resolution fingerprint that can be matched quickly and easily. Using this information, it is possible to accurately identify pairing/grouping actions on multiple devices. Indeed, the system is a hyper accurate solution that leverages a whole new facet of data input that was not previously used by other methods. Touchscreens can provide fingerprint data that is magnitudes more rich than the standard accelerometer sensor. As a result, the rich data can translate to magnitudes more accurate identification of the same, single, uniform gesture being performed on multiple devices.

Moreover, the device pairing system of this exemplary embodiment uses basic sensors installed on every smartphone in use today, and the installation of custom software on the mobile devices is not required. The system also leverages the HTML5 standards that are already ubiquitous to almost all mobile devices at the moment, and which are sufficient for the computing power required for the pairing system and which will greatly reduce the usage friction of the system by multiple users. Thus, unlike conventional pairing approaches, the pairing system of this disclosure is operating system agnostic and does not require a custom application or specialized hardware or software to be installed on the mobile devices. The system requirements of the pairing system are low enough such that it will be foreseeably universally accessible on all models of touchscreen-enabled smart devices.

While the system 100 is referred to as a 'mobile' device pairing system, and the examples of this disclosure generally refer to pairing mobile devices (such as mobile devices 11 and 12), it should be understood that the aspects of this disclosure are applicable to, for example, pairing any two or more touchscreen-enabled devices (including, for example, televisions, cameras, video cameras, music players, media players, computer terminals, ATMs, in-car audio entertainment systems, cash registers, payments systems, kiosks, etc.). Thus, any of the mobile devices 11 and 12 in FIG. 1 may be substituted with any of the aforementioned touchscreen-enabled devices. For example, FIGS. 28-35 illustrate exemplary embodiments wherein a touchscreen-enabled mobile device is paired with another touchscreen-enabled device, including an in-car audio entertainment system, a television, an ATM and a cash register machine.

While the pairing/grouping server 15 and $3^{rd}$ party server 13 may be described as being separate devices (see FIG. 1), the paring server and $3^{rd}$ party server may in fact be manifested in a single device.

While the examples shown in the figures (e.g. FIG. 1) may include two mobile devices, one third party server and one pairing server, it should be appreciated that such numbers of devices, systems, servers, apparatuses and terminals are arbitrary and are selected as an example in order to facilitate discussion, and that the subject matter of this disclosure can be implemented in a system including one or more systems, servers, apparatuses and terminals.

Further, it is noted that a mobile device, third party server and pairing server can be included in one integrated device (or of course can be separate devices). Other devices, such as scanners, printers and multi-function devices (MFDs) may also be connected to the network.

Another exemplary embodiment is described as follows. Conventionally, when a user wishes to initiate a Bluetooth or Wifi connection (e.g. connecting a mobile device to a local network, or to another mobile device, automobile, etc.), the user is forced to manually enter a code or password.

Figure 8:
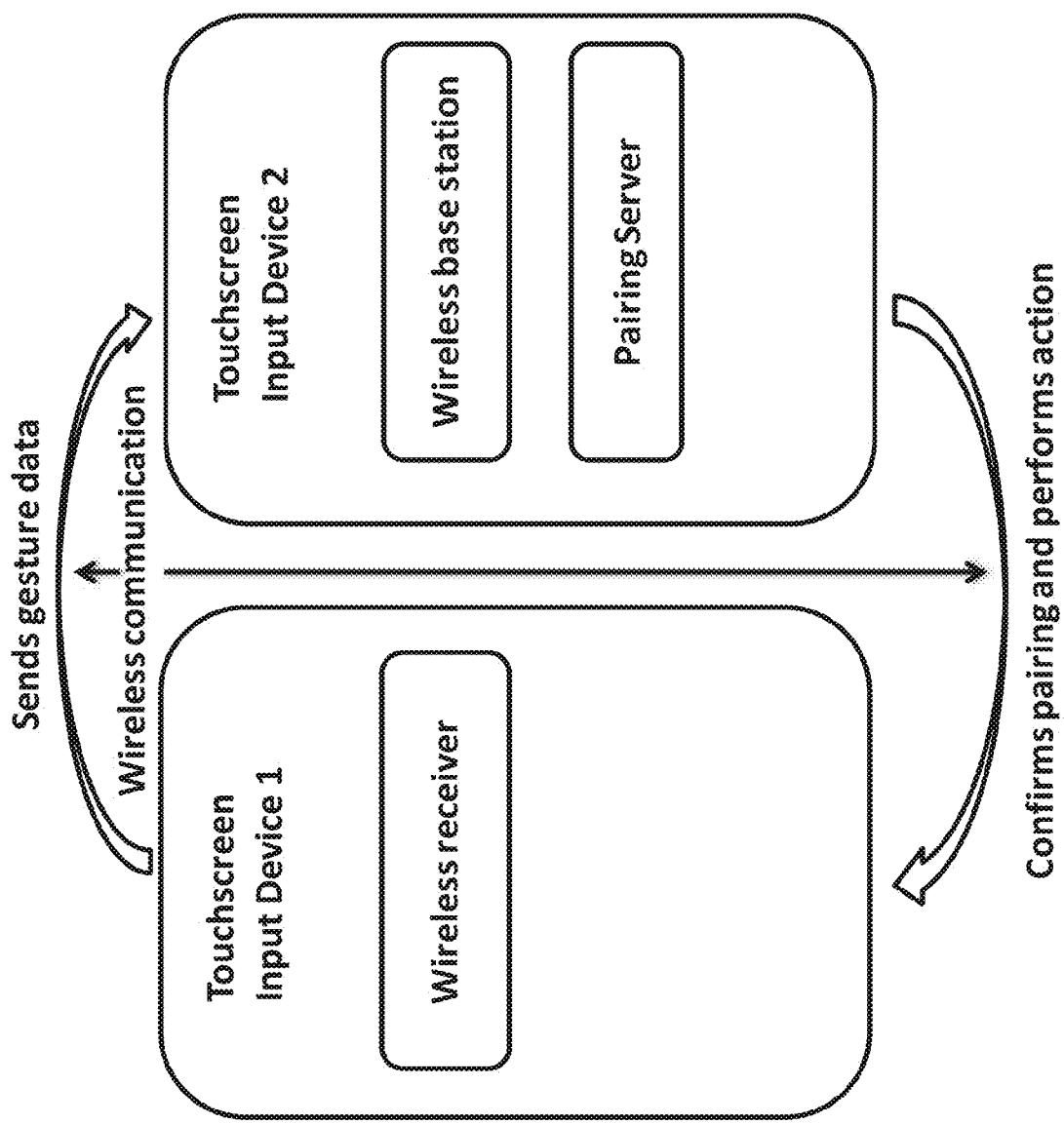
FIGS. 8-10 illustrate examples of how touchscreen input device 1 is paired with touchscreen input device 2 that functions as a pairing server and a wireless base station (FIG. 8), Bluetooth broadcaster (FIG. 9), or WiFi base station (FIG. 10), to thereby allow input device 1 to connect to a wireless network (FIG. 8), Bluetooth network (FIG. 9), or WiFi network (FIG. 10), according to various exemplary embodiments.
Figure 9:
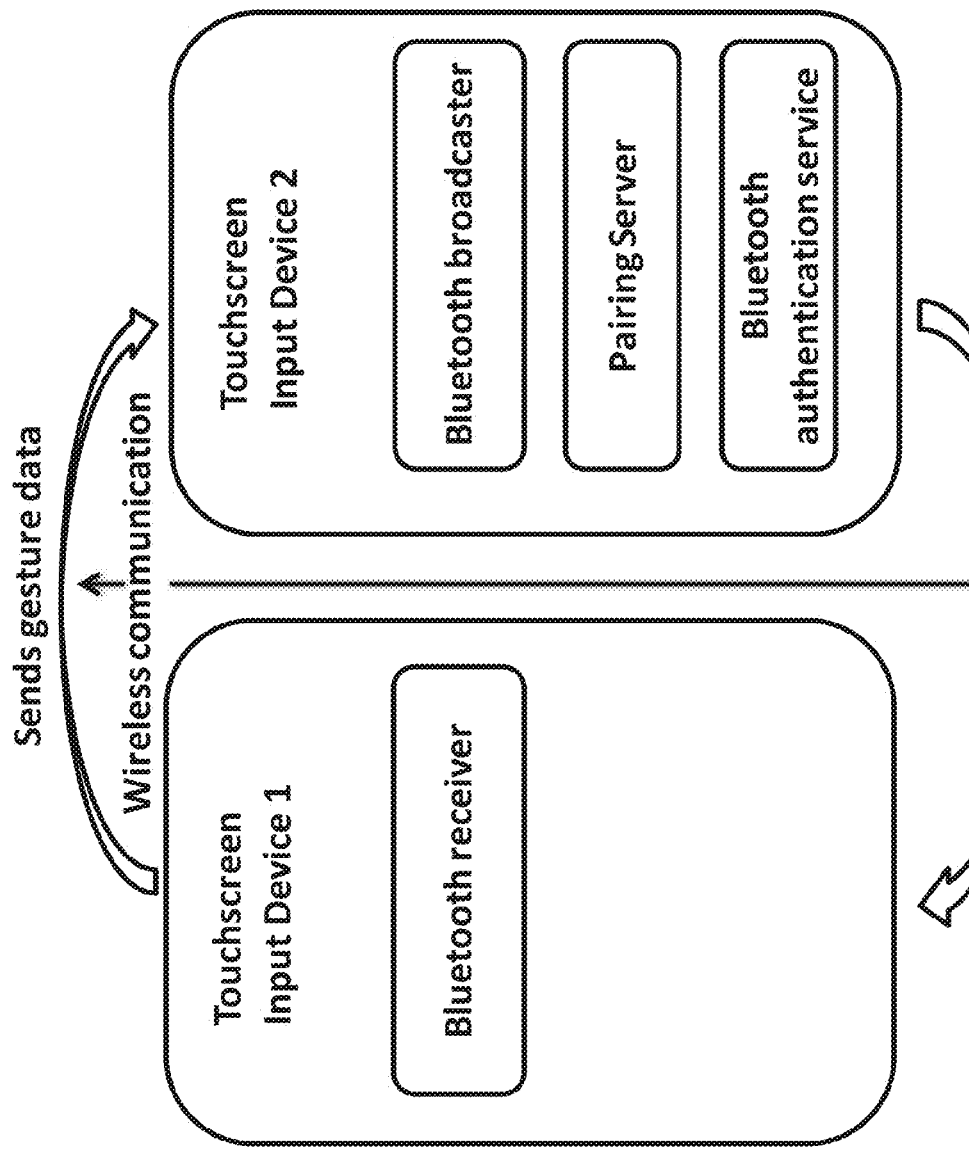
Figure 10:
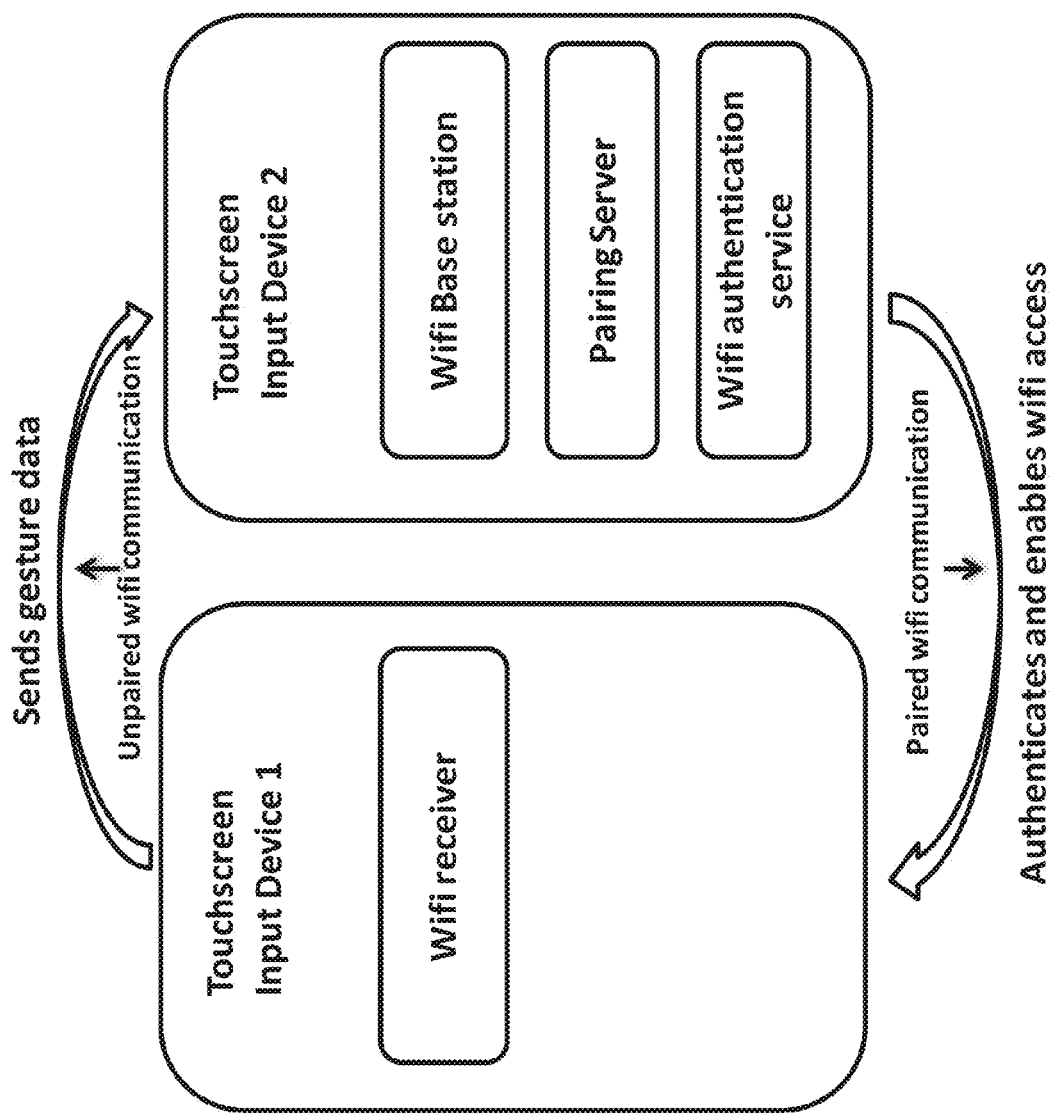

FIGS. 8-10 illustrate an embodiment where touchscreen input device 2 is in fact the pairing server, and touchscreen input device 1 connects to it via the touchscreen gesture across the displays of the two devices. According to another exemplary embodiment, touchscreen input device 2 is also a wireless base station (FIG. 8), Bluetooth broadcaster (FIG. 9), or WiFi base station (FIG. 10), and touchscreen input device 1 connects to a wireless network (FIG. 8), Bluetooth network (FIG. 9) or WiFi network (FIG. 10) by performing the touchscreen gesture with touchscreen input device 2.

Thus, if the user has a mobile device (e.g. phone) that is offline, and the user desires to connect to local network corresponding to another device (e.g. a laptop operating as a bluetooth broadcaster or Wifi/wireless base station), the user simply places the mobile device next to the laptop, makes the single continuous loop gesture, and the laptop may—in accordance with the exemplary embodiments described throughout this disclosure—authenticate the mobile device, pair the devices, and permit the mobile device to connect to the local wireless network (FIG. 8), Bluetooth network (FIG. 9) or WiFi network (FIG. 10) corresponding to the laptop device.

Each of the third party server 13, pairing server 15 and device pairing server 80 can be any computing device, including but not limited to a personal, notebook or workstation computer, a kiosk, a PDA (personal digital assistant), a MFD (multi-function device), a server, a mobile phone or handset, another information terminal, etc., that can communicate through a network with other devices.

Figure 11:
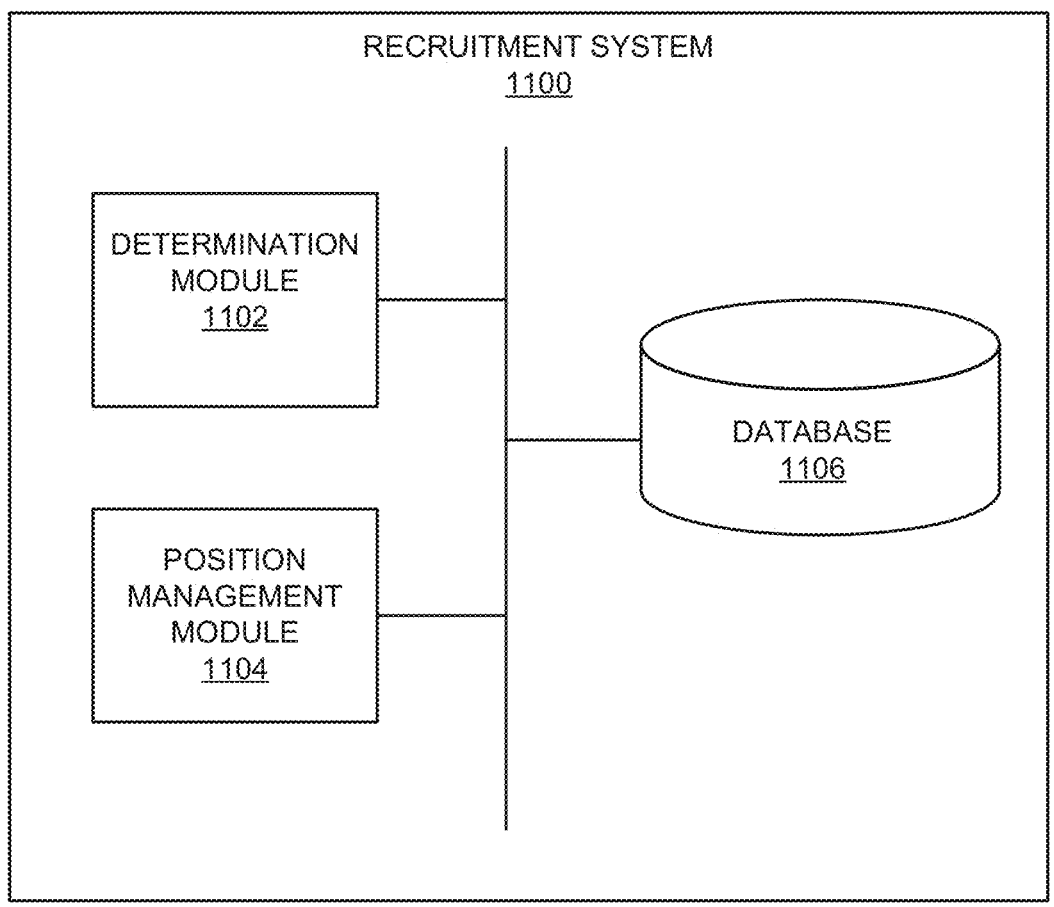
FIG. 11 is a block diagram of an example system, according to various embodiments.

Turning now to FIG. 11, a recruitment system 1100 includes a determination module 1102, a position management module 1104, and a database 1106. The modules of the recruitment system 1100 may be implemented on a single device such as a recruitment device, or on separate devices interconnected via a network. The aforementioned recruitment device may correspond to, for example, a client machine or an application server. According to various embodiments, the recruitment system 1100 may correspond to the pairing server 15 and/or the third-party Web server 13 described in various embodiments above.

Figure 12:
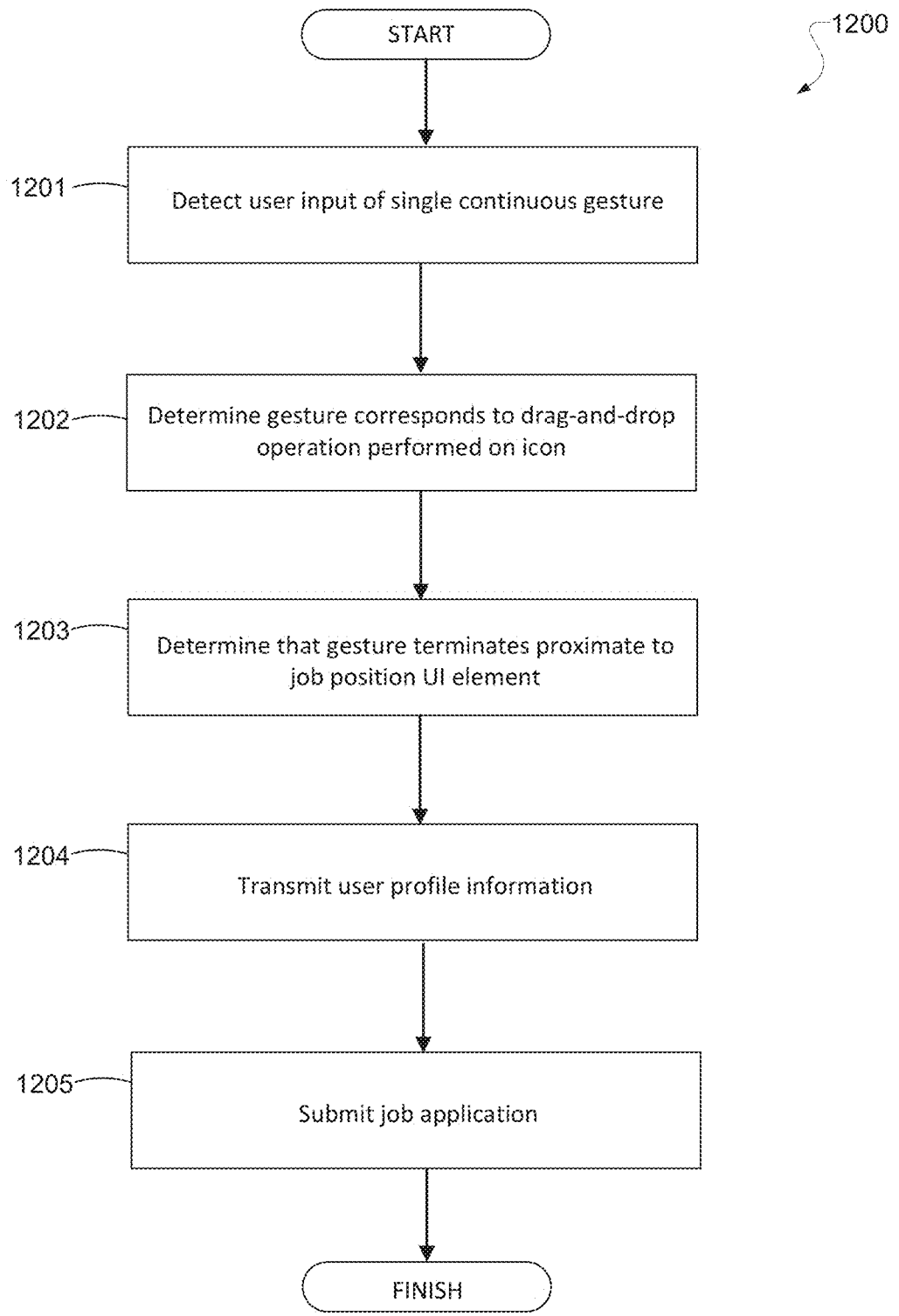
FIG. 12 is a flowchart illustrating an example method, according to various embodiments.

FIG. 12 is a flowchart illustrating an example method 1200, according to various embodiments. The method 1200 may be performed at least in part by, for example, the recruitment system 1100 illustrated in FIG. 11 (or an apparatus having similar modules).

Figure 13:
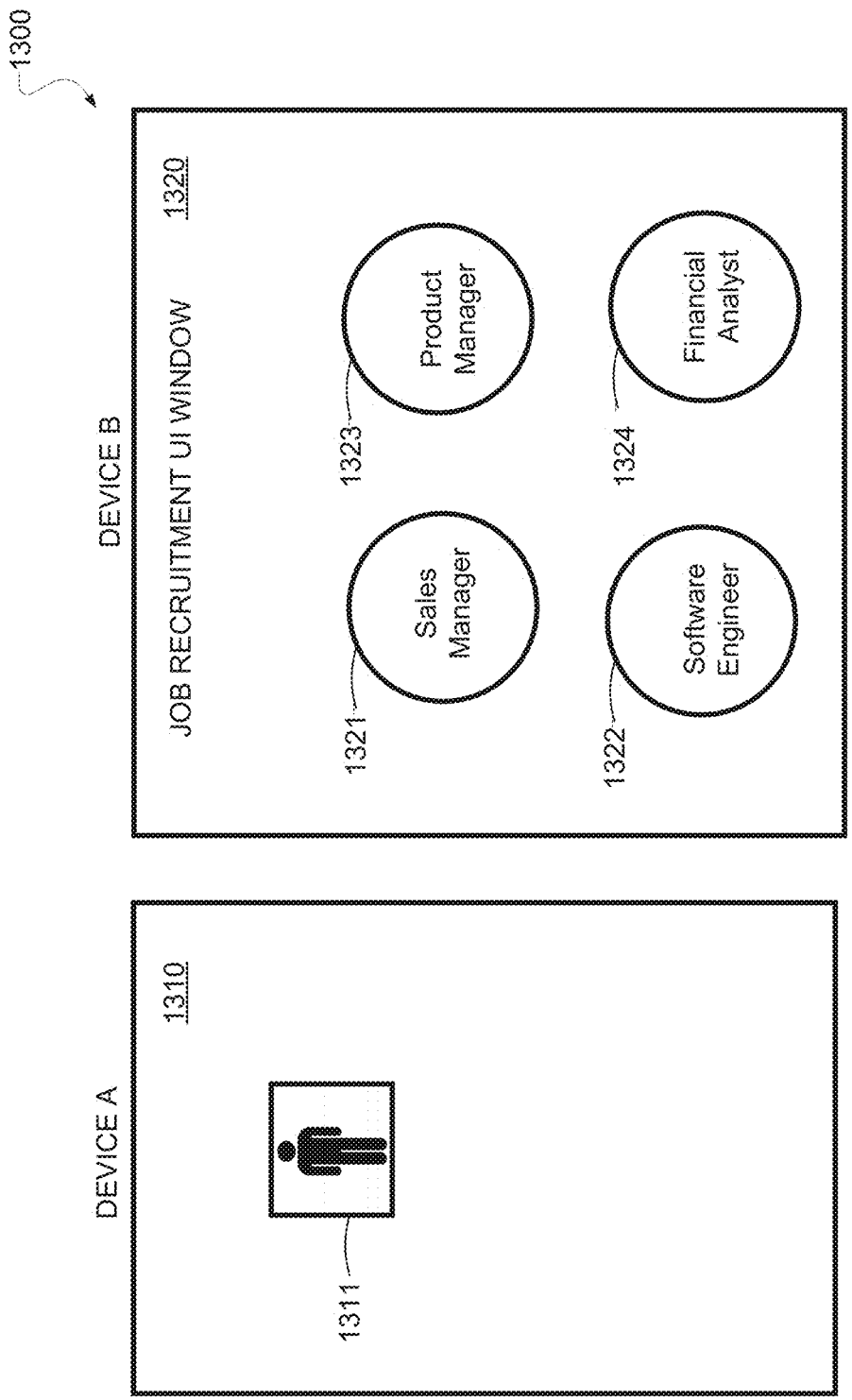
FIG. 13 illustrates an example of touch sensitive surfaces of multiple devices, according to various exemplary embodiments.

In 1201, the determination module 1102 detects user input of a single continuous gesture across the touch-sensitive surfaces of a first device and a second device, where the single continuous gesture extends from the touch-sensitive surface of the first device to the touch-sensitive surface of the second device. For example, FIG. 13 illustrates an environment 1300 where Device A and Device B are placed adjacent to each other.

Figure 15:
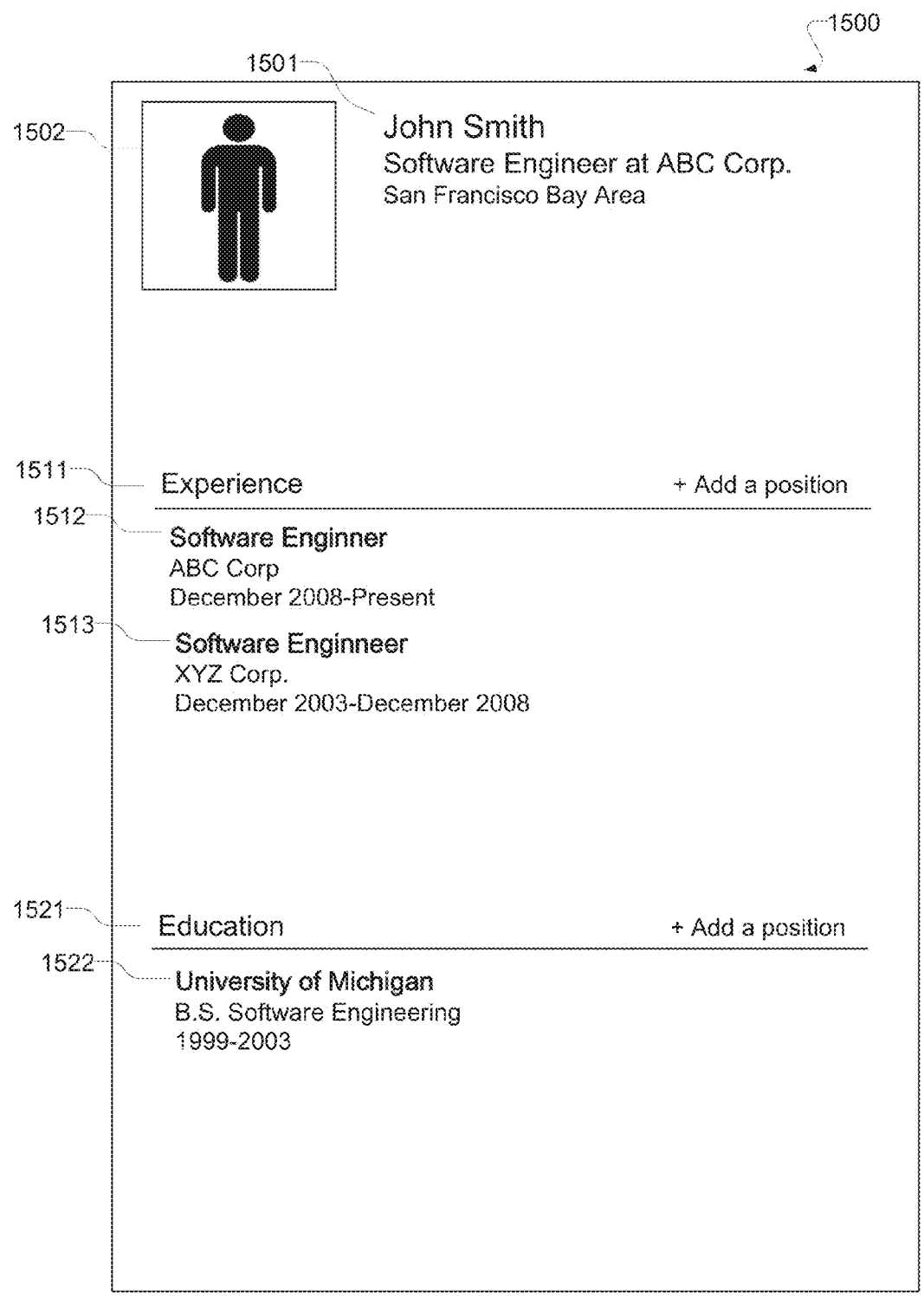
FIG. 15 illustrates an example of the user profile page, according to various exemplary embodiments.

The touch sensitive surface 1310 of Device A includes an icon 1311 that represents user profile information of a user (e.g., the user of Device A). Device A may correspond to, for example, a mobile device (e.g., smart phone) of a job applicant that is participating a recruiting meeting or recruiting job fair. According to an exemplary embodiment, the icon 1311 may reference (or contain a pointer or link to) user profile information or a user profile page associated with the social network service such as LinkedIn®. For example, the icon 1311 many reference the user profile page 1500 associated with the user John Smith, illustrated in FIG. 15. The user profile page 1500 includes various information about the user John Smith, including basic biographical information 1501, the user photo 1502, an experience field 1511 including experience positions 1512 and 1513, and an education field 1521 including an education position 1522. The icon 1311 may alternatively reference the user profile data 1600 (see FIG. 16) corresponding to the information in the member profile page 1500, where the user profile data 1600 is stored in a data table or similar data structure in a data repository (e.g., database 1106 illustrated in FIG. 11). Thus, FIG. 15 illustrates the display of the user profile information 1600 in the format of a user profile page 1500.

The user profile page 1500 is merely exemplary. For example, while the user profile page 1500 includes experience and educations sections/fields, it is apparent that these sections/fields may be supplemented or replaced by other sections/fields (e.g., a general portfolio section/field, an art portfolio section/field, a music portfolio section/field, a photography portfolio section/field, a multimedia section/field, and so forth). The user profile page may include other information, such as various identification information (name, username, email address, geographic address, networks, location, phone number, etc.), education information, employment information, resume information, skills, experience, activities, group membership, images, photos, preferences, news, status, links or URLs on the profile page, and so forth, as understood by those skilled in the art. Thus, the user profile page 1500 and/or the user profile data 1600 may include a resume of the user.

Referring back to FIG. 13, Device B may correspond to a mobile device (e.g., a tablet) of a recruiter that is present at a recruiting meeting or a job recruiting fair. A job recruitment user interface (UI) window is displayed on the touch sensitive surface 1320 of Device B, where the job recruitment UI window displays multiple job position UI elements 1321-1324. Each of the job position UI elements 1321-1324 corresponds to an available a job position. For example, the job position UI elements 1322 entitled "Software Engineer" corresponds to an available job position of "Software Engineer". As described in more detail below, when a user such as a job applicant drag and drops an icon representing user profile information into one of the job position UI elements, the recruitment system 1100 automatically submits an application for an available job position corresponding to the job position UI element, on behalf of the user.

Figure 14:
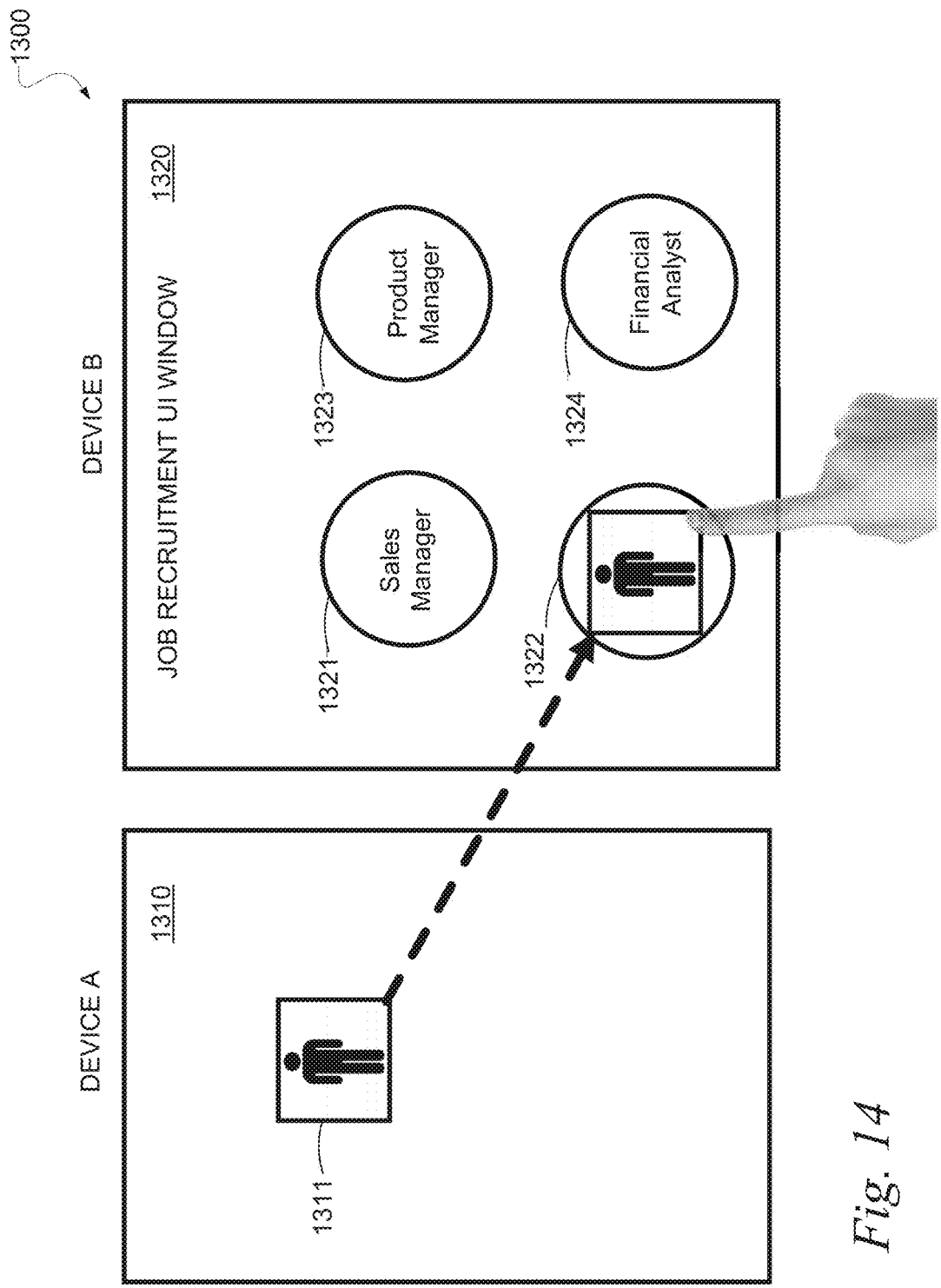
FIG. 14 illustrates an example of a single continuous gesture performed across the touch sensitive surfaces of multiple devices, according to various exemplary embodiments.

For example, as illustrated in FIG. 14, a user (e.g., the user of Device A) may select the icon 1311 and drag the icon from the touch sensitive surface 1310 of Device A to the touch sensitive surface 1320 of Device B. The drag-and-drop operation may terminate at one of the job position UI elements 1322 corresponding to the "Software Engineer" job position. The manner in which the determination module 1102 detects the single continuous gesture that extends from the touch sensitive surface 1310 to the touch sensitive surface 1320 is described elsewhere in this disclosure.

Referring back to FIG. 12, in 1202, the determination module 1102 determines that the gesture corresponds to a drag-and-drop operation performed on an icon displayed on the touch-sensitive surface of the first device, the icon representing user profile information. That is, the Device A may transmit information to the determination module 1102 indicating that the single continuous gesture began at a position on the touch sensitive surface 1310 at which the icon 1311 is displayed.

In 1203 in FIG. 12, the determination module 1102 determines that the single continuous gesture terminates proximate to a job position UI element in a job recruitment user interface window displayed on the touch-sensitive surface of the second device. That is, as illustrated FIG. 14, Device B detects that the single continuous gesture terminates at a position on the touch sensitive surface 1320 corresponding to the job position UI element 1322.

In 1204 in FIG. 12, the position management module 1104 transmits the user profile information of the user from the first device to the second device. For example, the position management module 1104 may transmit a request to Device A for the user profile information associated with the icon 1311 (e.g., the user profile information 1600 in FIG. 16). When the position management module 1104 receives this information from Device A, the position management module 1104 transmits this information to Device B.

In 1205, the position management module 1104 submits a job application on behalf of the user for the available job position, based on the user profile information that was transferred from Device A to device B. According to one embodiment, the position management module 1104 may transmit the user profile information 1600 in FIG. 16 to an e-mail address associated with the corresponding job position UI element 1322. According to another embodiment described in more detail below, the position management module 1104 may store the user profile information 1600 of the job applicant John Smith in a database that stores all of the user profile information for all job applicants for the corresponding position of "Software Engineer".

Figure 17:
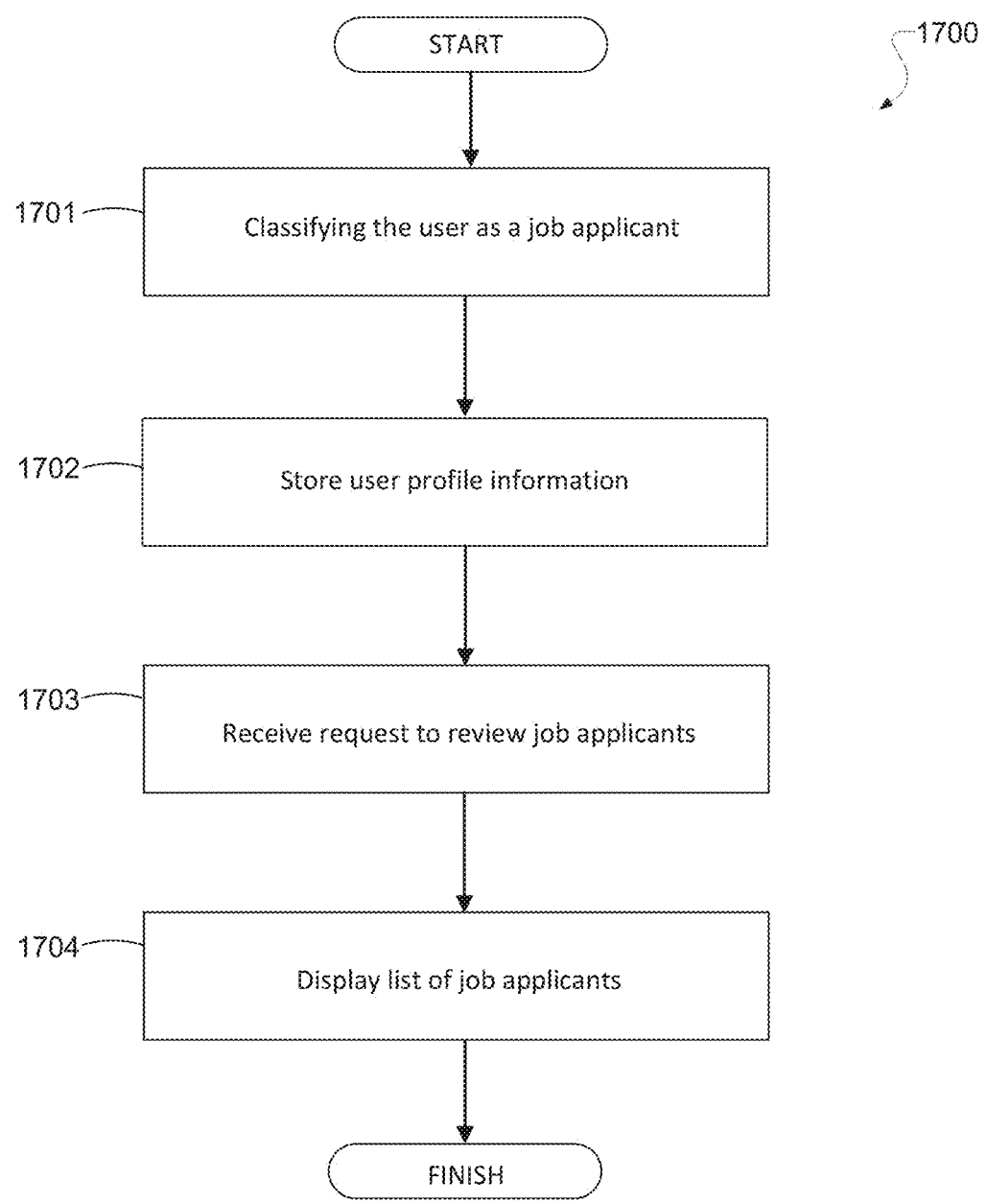
FIG. 17 is a flowchart illustrating an example method, according to various embodiments.

For example, FIG. 17 is a flowchart illustrating an example method 1700, according to various embodiments. The method 1700 may be performed after, for example, the method 1200 illustrated in FIG. 12. The method 1700 may be performed at least in part by, for example, the 1100 illustrated in FIG. 11 (or an apparatus having similar modules).

In 1701, the position management module 1104 classifies the user as a job applicant associated with the available job position "Software Engineer", associated with the job position UI element 1322 (that was determined in 1203 in FIG. 12). In 1702, the position management module 1104 stores the user profile information in a job applicant database table associated with the job position UI element 1322 and the corresponding job position of "Software Engineer". For example, FIG. 18 illustrates an example of a data table 1800 or similar data structure that stores plural user profile information of plural job applicants associated with the job position UI element 1322 and the corresponding job position "Software Engineer".

Figure 19:
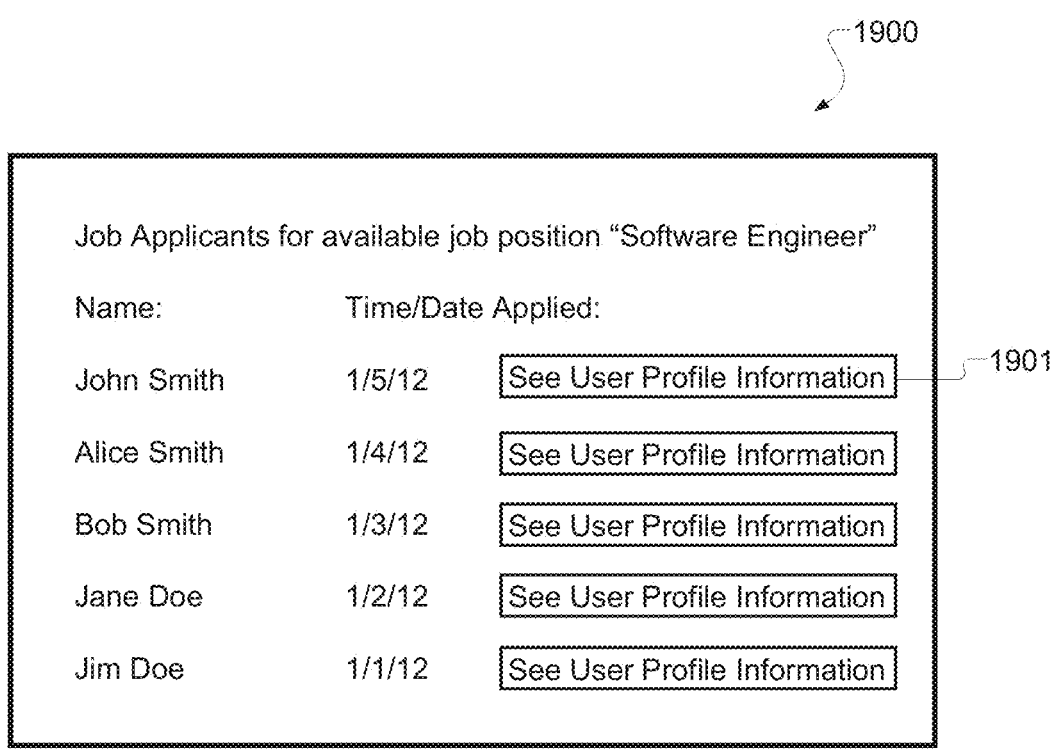
FIG. 19 illustrates an example of a list of job applicants, according to various exemplary embodiments.

In 1703, the position management module 1104 receives a request to review the job applicants associated with the available job position. For example, a registered or authorized user of Device B (such as a recruiter) may log into the Device B and select the job position UI element 1322 in a predetermined manner (e.g., by double-clicking on the element 1322). In 1704, the position management module 1104 displays a list of the job applicants, based on the plural user profile information stored in the table. That is, the information in the data table 1800 that lists all the applicants for the job position of "Software Engineer" may be utilized to create the window in 1900 (see FIG. 19) that indicates all the job applicants for the corresponding job position of "Software Engineer". As illustrated in FIG. 19, there are a selectable buttons 1901 entitled "See user profile information" for each of the job applicants. When one of the buttons 1901 is selected, the profile information for that user is displayed, in the format of the user profile page 1500 in FIG. 15 or another format.

According to another exemplary embodiment, the position management module 1104 may determine whether a particular job applicant is qualified for a particular job position, by comparing the user profile information of the job applicant with job qualification information associated with the job position. This is an optional determination.

Figure 20:
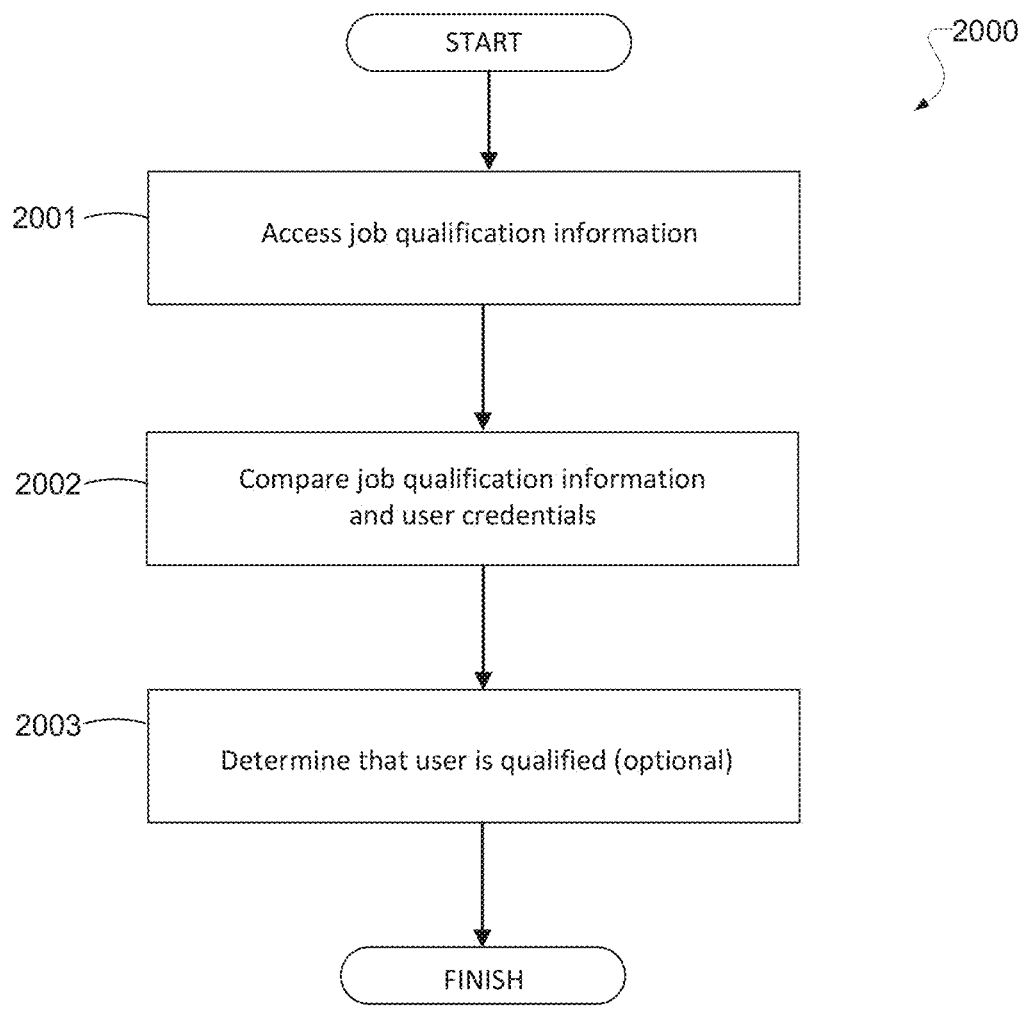
FIG. 20 is a flowchart illustrating an example method, according to various embodiments.

For example, FIG. 20 is a flowchart illustrating an example method 2000, according to various embodiments. The method 2000 may occur after the method 1200 or 1700, and may be performed at least in part by, for example, the 1100 illustrated in FIG. 11 (or an apparatus having similar modules). In 2001, the position management module 1104 accesses job qualification information associated with an available job position. For example, FIG. 21*a* illustrates job qualification information 2100 associated with the job position "Software Engineer", where the job qualification information 2100 identifies various criteria, requirements, or prerequisites for the job (e.g., a minimum number of years of experience at a similar position, a particular education, etc.).

In 2002, the position management module 1104 compares the job qualification information and the user credentials included in the user profile information. For example, the position management module 1104 compares the job qualification information 2100 with the user profile information 1600 of the user John Smith. In 2003, the position management module 1104 determines that the user is qualified for the available job position, based on the comparison. For example, the position management module 1104 will determine that the user John Smith is qualified for the job position "Software Engineer", since the user profile information 1600 of the user John Smith indicates that the user satisfies the qualifications in the job qualification information 2100 (i.e., the user has 3+ years of experience as a "Software Engineer", and the user has a BSE in "Software Engineering"). Based on this determination, the position management module 1104 may display a notification 2150 (see FIG. 21*b*) indicating that the user is qualified for the job position. The notification may be displayed in a user interface on the touch sensitive surface of Device B. For example, the position management module 1104 may display the notification 2150 when the user of Device B selects one of the buttons 1901 in the user interface 1900.

According to another exemplary embodiment, if the user performs the reverse of the aforementioned single continuous gesture, by dragging one of the job position UI elements 1321-1324 from the touch sensitive surface 1320 of Device B to the touch sensitive surface 1310 of Device A, then information regarding a job position associated with that job position UI element is transferred from Device B to Device A.

Figure 22:
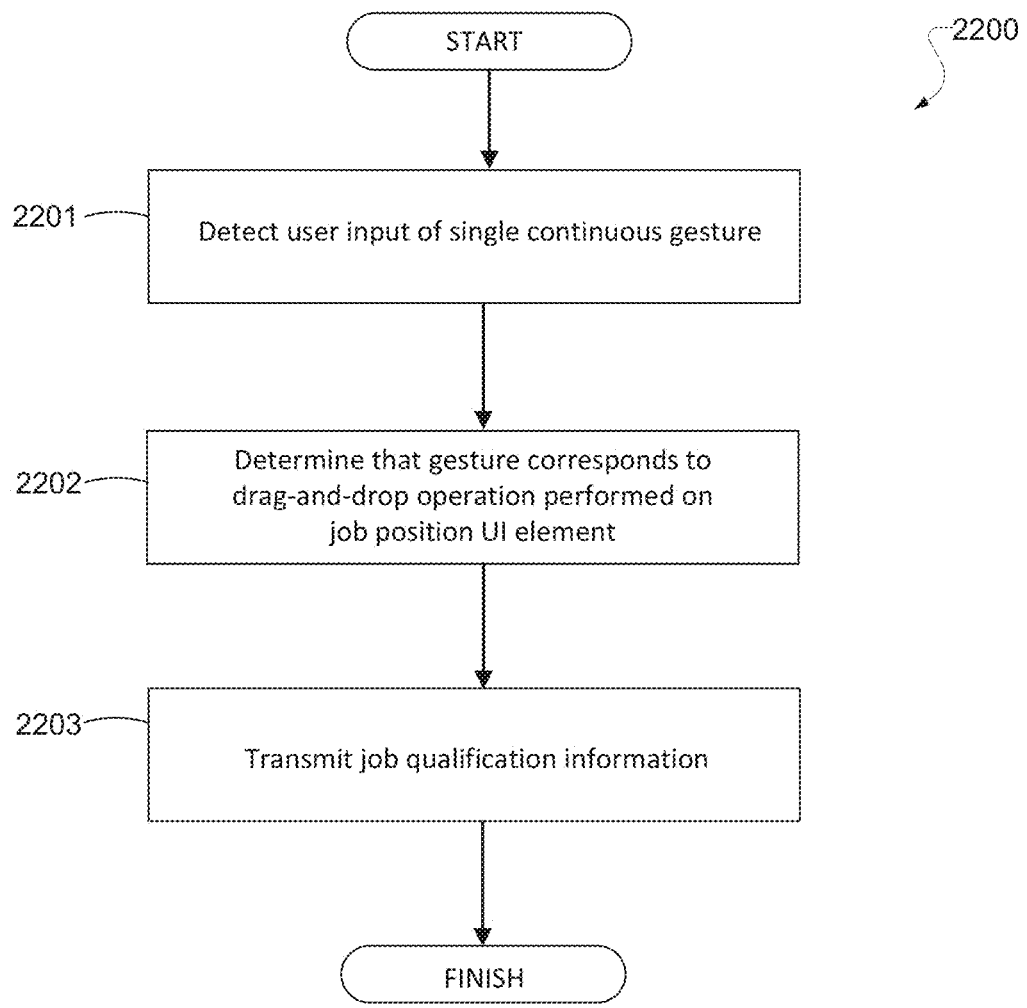
FIG. 22 is a flowchart illustrating an example method, according to various embodiments.
Figure 23:
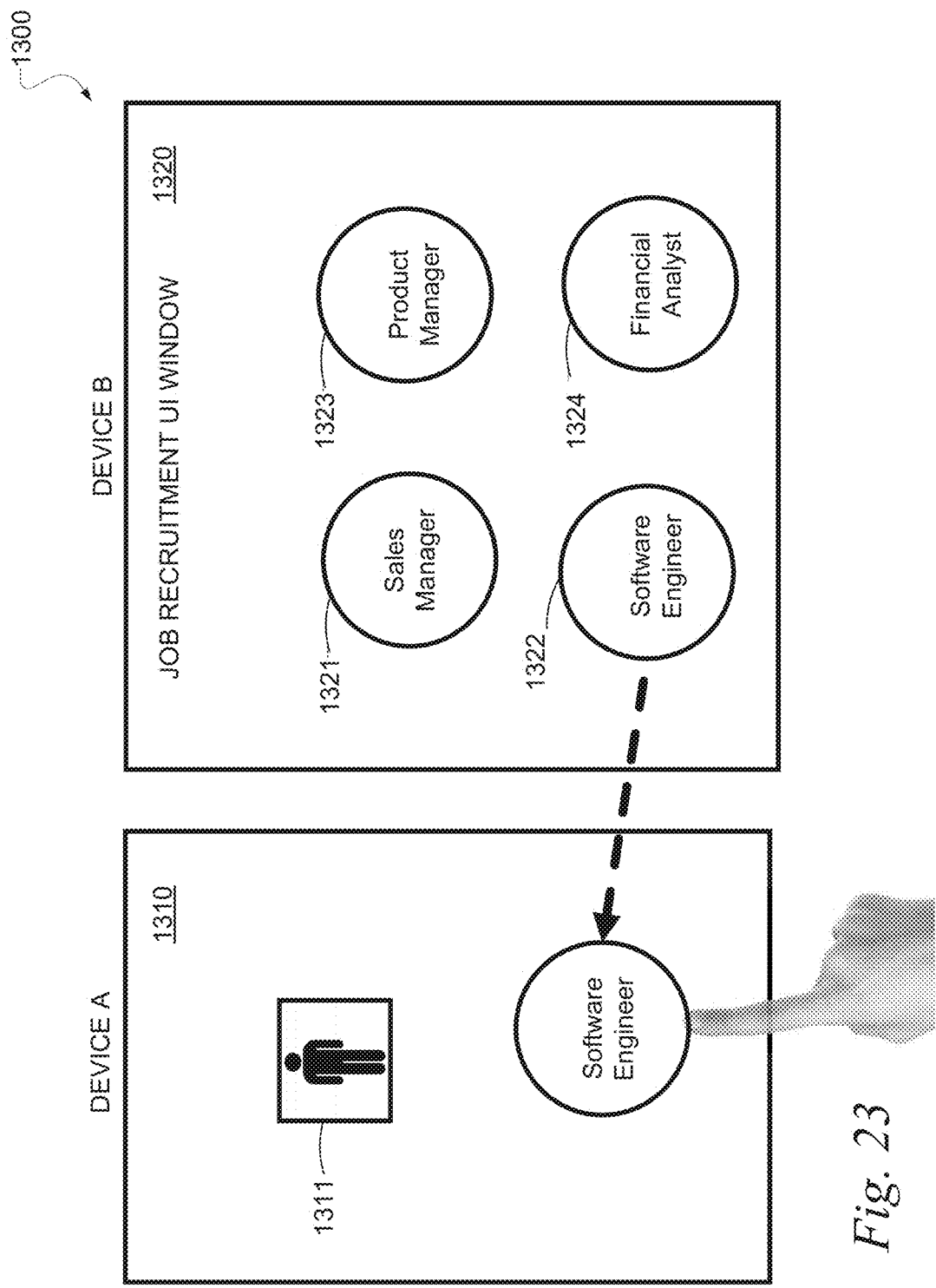
FIG. 23 illustrates an example of a single continuous gesture performed across the touch sensitive surfaces of multiple devices, according to various exemplary embodiments.

For example, FIG. 22 is a flowchart illustrating an example method 2200, according to various embodiments. The method 2200 may be performed at least in part by, for example, the 1100 illustrated in FIG. 11 (or an apparatus having similar modules). In 2201, the position management module 1104 detects user input of a second single continuous gesture across the touch sensitive surfaces of a first device and a second device, where the gesture extends from the touch-sensitive surface of the second device to the touch-sensitive surface of the first device. For example, as illustrated in FIG. 23, the position management module 1104 may detect that the user performed a single continuous gesture from the touch sensitive surface 1320 of Device B to the touch sensitive surface the content of Device A.

In 2202, the position management module 1104 determines that the second single continuous gesture corresponds to a drag-and-drop operation performed on the job position UI element displayed on the touch-sensitive surface of the second device, the job position UI element corresponding to an available job position. For example, as illustrated in FIG. 23, the position management module 1104 may receive information from Device B indicating that the single continuous gesture begins at a position of the touch sensitive surface 1320 corresponding to the job position UI element 1322. Similarly, the position management module 1104 may receive information from Device A indicating that the single continuous gesture terminates at a position within the touch sensitive surface 1310.

In 2203, the position management module 1104 transmits job qualification information associated with the available job position from the second device to the first device. For example, the position management module 1104 may request Device B to transmit job qualification information (e.g., see FIG. 21*a*) associated with the job position "Software Engineer" corresponding to the job position UI element 1322. The position management module 1104 may then forward this information to Device A. A copy of the UI element 1322 may be displayed on the touch sensitive surface 1310 of Device A. When the user selects this copy of the UI element 1322, device A may display a window (e.g., see FIG. 21) that displays the job qualification information of the available job position corresponding to UI element 1322.

While the examples above refer to job positions and job recruitment, the aspects of this disclosure are equally applicable to other types of recruitment, including college recruitment (i.e., student enrollment positions associated with academic entities).

Modules, Components and Logic

Certain embodiments are described herein as including logic or a number of components, modules, or mechanisms.

Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 24:
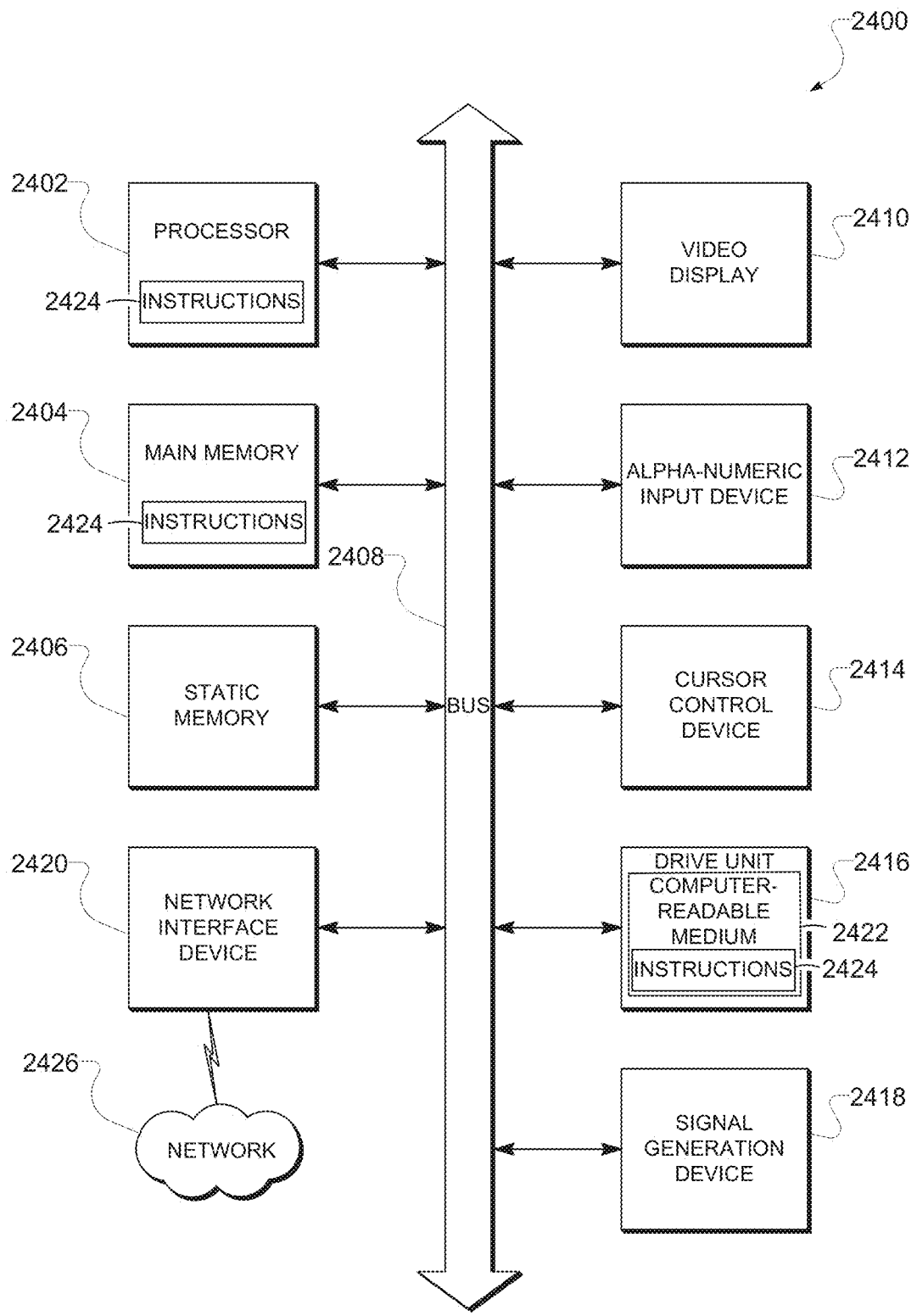
FIG. 24 is a block diagram of machine in the example form of a computer system within which instructions, for causing the machine to perform any one or more of the modules or methodologies discussed herein, may be executed.

FIG. 24 is a block diagram of machine in the example form of a computer system 2400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a central processing unit (CPU), a graphics processing unit (GPU) or both), a main memory 2404 and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2412 (e.g., a keyboard or a touch-sensitive display screen), a user interface (UI) navigation device 2414 (e.g., a mouse), a disk drive unit 2416, a signal generation device 2418 (e.g., a speaker) and a network interface device 2420.

Machine-Readable Medium

The disk drive unit 2416 includes a machine-readable medium 2422 on which is stored one or more sets of instructions and data structures (e.g., software) 2424 embodying or utilized by any one or more of the methodologies or functions described herein. The instructions 2424 may also reside, completely or at least partially, within the main memory 2404 and/or within the processor 2402 during execution thereof by the computer system 2400, the main memory 2404 and the processor 2402 also constituting machine-readable media.

While the machine-readable medium 2422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2424 may further be transmitted or received over a communications network 2426 using a transmission medium. The instructions 2424 may be transmitted using the network interface device 2420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    detecting, using one or more processors, user input of a single continuous gesture from a touch-sensitive surface of a first device to a touch-sensitive surface of a second device;
    determining that the gesture corresponds to a drag-and-drop operation performed on an icon displayed on the touch-sensitive surface of the first device, the icon being associated with a pointer to stored user profile information of a user associated with an online social networking service;

determining, using one or more processors, that the gesture terminates proximate to a job position user interface element in a job recruitment user interface window displayed on the touch-sensitive surface of the second device, the job position user interface element corresponding to an available job position associated with a specific entity;

transmitting the user profile information of the user from the first device to the second device; and automatically causing an electronic job application to be submitted on behalf of the user for the available job position, based on the user profile information, by causing the user profile information to be stored in a job applicant database table associated with the available job position and connected to the second device via a network, the database table storing one or more instances of user profile information corresponding to one or more job applicants associated with the available job position.

2. The method of claim 1, further comprising classifying the user as a job applicant associated with the available job position.

3. The method of claim 2, further comprising:
receiving a request to review the job applicants associated with the available job position; and
displaying a list of the job applicants, based on the plural user profile information stored in the table.

4. The method of claim 1, further comprising:
accessing job qualification information associated with the available job position;
comparing the job qualification information and user credentials included in the user profile information; and
determining that the user is qualified for the available job position, based on the comparison.

5. The method of claim 1, wherein the job position user interface element corresponds to an available student enrollment position associated with an academic entity.

6. The method of claim 1, wherein the user profile information includes a resume or contact information of the user.

7. The method of claim 1, wherein the job recruitment user interface window includes a plurality of job position user interface elements including said job position user interface element.

8. The method of claim 1, further comprising:
detecting user input of a second single continuous gesture from the touch-sensitive surface of the second device to the touch-sensitive surface of the first device;
determining that the second single continuous gesture corresponds to a drag-and-drop operation performed on the job position user interface element displayed on the touch-sensitive surface of the second device, the job position user interface element corresponding to an available job position; and
transmitting job qualification information associated with the available job position from the second device to the first device.

9. The method of claim 1, wherein the automatically causing the electronic job application to be submitted further comprises:
transmitting the user profile information of the user to an e-mail address associated with the job position user interface element.

10. The method of claim 1, wherein the user profile information stored in the database table includes a current job attribute, an education attribute, and a skills attribute of the user.

11. An apparatus comprising:
a determination module, comprising one or more processors, configured to:
detect user input of a single continuous gesture from a touch-sensitive surface of a first device to a touch-sensitive surface of a second device;
determine that the gesture corresponds to a drag-and-drop operation performed on an icon displayed on the touch-sensitive surface of the first device, the icon being associated with a pointer to stored user profile information of a user associated with an online social networking service; and
determine that the gesture terminates proximate to a job position user interface element in a job recruitment user interface window displayed on the touch-sensitive surface of the second device, the job position user interface element corresponding to an available job position associated with a specific entity, and a position management module, comprising the one or more processors, configured to:
transmit the user profile information of the user from the first device to the second device; and
automatically cause an electronic job application to be submitted on behalf of the user for the available job position, based on the user profile information, by causing the user profile information to be stored in a job applicant database table associated with the available job position and connected to the second device via a network, the database table storing one or more instances of user profile information corresponding to one or more job applicants associated with the available job position.

12. The apparatus of claim 11, wherein the position management module is further configured to:
classify the user as a job applicant associated with the available job position.

13. The apparatus of claim 12, wherein the position management module is further configured to:
receive a request to review the job applicants associated with the available job position; and
display a list of the job applicants, based on the plural user profile information stored in the table.

14. The apparatus of claim 11, wherein the position management module is further configured to:
access job qualification information associated with the available job position;
compare the job qualification information and user credentials included in the user profile information; and
determine that the user is qualified for the available job position, based on the Comparison.

15. The apparatus of claim 11, wherein the position management module is further configured to:
detect user input of a second single continuous gesture from the touch-sensitive surface of the second device to the touch-sensitive surface of the first device; and
determine that the second single continuous gesture corresponds to a drag-and-drop operation performed on the job position user interface element displayed on the touch-sensitive surface of the second device, the job position user interface element corresponding to an available job position, and wherein the position management module is further configured to transmit job qualification information associated with the available job position from the second device to the first device.

16. A non-transitory machine-readable storage medium having embodied thereon instructions executable by one or more machines to perform operations comprising:
   detecting, using one or more processors, user input of a single continuous gesture from a touch-sensitive surface of a first device to a touch-sensitive surface of a second device;
   determining that the gesture corresponds to a drag-and-drop operation performed on an icon displayed on the touch-sensitive surface of the first device, the icon being associated with a pointer to stored user profile information of a user associated with an online social networking service;
   detecting that the gesture terminates proximate to a job position user interface element in a job recruitment user interface window displayed on the touch-sensitive surface of the second device, the job position user interface element corresponding to an available job position associated with a specific entity;
   transmitting the user profile information of the user from the first device to the second device; and
   automatically causing an electronic job application to be submitted on behalf of the user for the available job position, based on the user profile information, by causing the user profile information to be stored in a job applicant database table associated with the available job position and connected to the second device via a network, the database table storing one or more instances of user profile information corresponding to one or more job applicants associated with the available job position.

* * * * *

UNITED STATES PATENT AND TRADEMARK OFFICE
CERTIFICATE OF CORRECTION

PATENT NO. : 9,201,579 B2  
APPLICATION NO. : 13/708842  
DATED : December 1, 2015  
INVENTOR(S) : Brikman et al.

Page 1 of 1

It is certified that error appears in the above-identified patent and that said Letters Patent is hereby corrected as shown below:

In the claims

In column 19, line 24, in Claim 2, after "comprising", insert --¶--, therefor

In column 20, line 23, in Claim 11, delete "entity," and insert --entity;--, therefor In column 20, line 40, in Claim 12, delete "to:" and insert --to--, therefor In column 20, line 56, in Claim 14, delete "Comparison." and insert --comparison.--, therefor Signed and Sealed this
Twelfth Day of April, 2016

Michelle K. Lee
*Director of the United States Patent and Trademark Office*